US011535779B2

(12) United States Patent
He et al.

(10) Patent No.: US 11,535,779 B2
(45) Date of Patent: Dec. 27, 2022

(54) MULTI-FUNCTIONAL ANTI-ICING HYDROGEL MATERIALS AND METHODS FOR CONTROLLING ICE NUCLEATION, GROWTH AND ADHESION

(71) Applicant: The Regents of the University of California, Oakland, CA (US)

(72) Inventors: Ximin He, Los Angeles, CA (US); Zhiyuan He, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 128 days.

(21) Appl. No.: 17/185,430

(22) Filed: Feb. 25, 2021

(65) Prior Publication Data
US 2021/0261838 A1 Aug. 26, 2021

Related U.S. Application Data

(60) Provisional application No. 62/981,460, filed on Feb. 25, 2020.

(51) Int. Cl.
*C09K 3/18* (2006.01)
*B05D 1/00* (2006.01)

(52) U.S. Cl.
CPC .............. *C09K 3/18* (2013.01); *B05D 1/005* (2013.01); *B05D 2202/15* (2013.01); *B05D 2202/25* (2013.01); *B05D 2202/45* (2013.01); *B05D 2507/01* (2013.01)

(58) Field of Classification Search
CPC ...... B05D 1/005; B05D 5/08; B05D 2202/15; B05D 2202/25; B05D 2202/45; B05D 2507/01; C09K 3/18; C09K 3/185
See application file for complete search history.

(56) References Cited

PUBLICATIONS

Ahmadi et al., "Passive Antifrosting Surfaces Using Microscopic Ice Patterns", ACS Applied Materials & Interfaces, Sep. 26, 2018, vol. 10, No. 38, pp. 32874-32884, doi: 10.1021/acsami.8b11285.
Alizadeh et al., "Dynamics of Ice Nucleation on Water Repellent Surfaces", Langmuir, Jan. 11, 2012, vol. 28, No. 6, pp. 3180-3186, doi: 10.1021/la2045256.
Anand et al., "Enhanced Condensation on Lubricant-Impregnated Nanotextured Surfaces", ACS Nano, Oct. 2, 2012, vol. 6, No. 11, pp. 10122-10129, doi: 10.1021/nn303867y.
Bartels-Rausch, "Ten things we need to know about ice and snow", Nature, Feb. 7, 2013, vol. 494, pp. 27-29, doi: 10.1038/494027a.
Boinovich et al., "Modus Operandi of Protective and Anti-icing Mechanisms Underlying the Design of Longstanding Outdoor Icephobic Coatings", ACS Nano, Apr. 5, 2019, vol. 13, No. 4, pp. 4335-4346, doi: 10.1021/acsnano.8b09549.
Boreyko et al., "Delayed Frost Growth on Jumping-Drop Superhydrophobic Surfaces", ACS Nano, Jan. 3, 2013, vol. 7, No. 2, pp. 1618-1627, doi: 10.1021/nn3055048.
Chatterjee et al., "Delaying Ice and Frost Formation Using Phase-Switching Liquids", Advanced Materials, Apr. 25, 2019, vol. 31, No. 17, 1807812, pp. 1-6, doi: 10.1002/adma.201807812.
Chen et al., "Activating the Microscale Edge Effect in a Hierarchical Surface for Frosting Suppression and Defrosting Promotion", Scientific Reports, Aug. 28, 2013, vol. 3, No. 2515, pp. 1-8, doi: 10.1038/srep02515.
Chen et al., "Anti-Ice Coating Inspired by Ice Skating", Small, Nov. 26, 2014, vol. 10, No. 22, pp. 4693-4699, doi: 10.1002/smll.201401557.
Chen et al., "Icephobic Surfaces Induced by Interfacial Nonfrozen Water", ACS Applied Materials & Interfaces, Jan. 5, 2017, vol. 9, No. 4, pp. 4202-4214, doi: 10.1021/acsami.6b13773.
Chen et al., "Robust prototypical anti-icing coatings with a self-lubricating liquid water layer between ice and substrate", ACS Applied Materials & Interfaces, May 22, 2013, vol. 5, No. 10, pp. 4026-4030, doi: 10.1021/am401004t.
Dou et al., "Anti-icing Coating with an Aqueous Lubricating Layer", ACS Applied Materials & Interfaces, May 14, 2014, vol. 6, No. 10, pp. 6998-7003, doi: 10.1021/am501252u.
Farhadi et al., "Anti-icing performance of superhydrophobic surfaces", Applied Surface Science, May 1, 2011, vol. 257, No. 14, pp. 6264-6269, doi: 10.1016/j.apsusc.2011.02.057.
Fitzner et al., "The Many Faces of Heterogeneous Ice Nucleation: Interplay Between Surface Morphology and Hydrophobicity", Journal of the American Chemical Society, Oct. 4, 2015, vol. 137, No. 42, pp. 13658-13669, doi: 10.1021/jacs.5b08748.
Golovin et al., "A predictive framework for the design and fabrication of icephobic polymers", Science Advances, Sep. 22, 2017, vol. 3, No. 9, e1701617, pp. 1-9, doi: 10.1126/sciadv.1701617.
Golovin et al., "Designing durable icephobic surfaces", Science Advances, Mar. 11, 2016, vol. 2, No. 3, e1501496, pp. 1-12, doi: 10.1126/sciadv.1501496.
Golovin et al., "Low-interfacial toughness materials for effective large-scale deicing", Science, Apr. 26, 2019, vol. 364, No. 6438, pp. 371-375, doi: 10.1126/science.aav1266.
Graeber et al., "Spontaneous self-dislodging of freezing water droplets and the role of wettability", Proceedings of the National Academy of Sciences of the United States of America, Oct. 17, 2017, vol. 114, No. 42, pp. 11040-11045, doi: 10.1073/pnas.1705952114.
Guo et al., "Icephobic/Anti-Icing Properties of Micro/Nanostructured Surfaces", Advanced Materials, May 15, 2012, vol. 24, No. 19, pp. 2642-2648, doi: 10.1002/adma.201104412.
Guo et al., "Tuning Ice Nucleation and Propagation with Counterions on Multilayer Hydrogels", Langmuir, Oct. 9, 2018, vol. 34, No. 40, pp. 11986-11991, doi: 10.1021/acs.langmuir.8b02106.

(Continued)

*Primary Examiner* — Anthony J Green
(74) *Attorney, Agent, or Firm* — KPPB LLP

(57) ABSTRACT

Highly efficient, multi-functional anti-icing compositions and methods of their use are provided. Anti-icing compositions include hydrogels configured to form thin film coatings on various surfaces via spin coating under UV irradiation. Multifunctional anti-icing platforms are based on polydimethylsiloxane (PDMS)-grafted polyelectrolyte hydrogels. Methods for grafting hydrophobic polydimethylsiloxane (PDMS) chains onto a hydrophilic polyelectrolyte network containing various counterions, forming a multifunctional hybrid anti-icing hydrogel are also provided.

29 Claims, 34 Drawing Sheets

(56) References Cited

PUBLICATIONS

He et al., "Bioinspired Materials for Controlling Ice Nucleation, Growth, and Recrystallization", Accounts of Chemical Research, Apr. 17, 2018, vol. 51, No. 5, pp. 1082-1091, doi: 10.1021/acs.accounts.7b00528.

He et al., "Inhibition of Heterogeneous Ice Nucleation by Bioinspired Coatings of Polyampholytes", ACS Appl. Mater. Interfaces, Aug. 16, 2017, vol. 9, No. 35, pp. 30092-30099, doi: 10.1021/acsami.7b10014.

He et al., "Tuning ice nucleation with counterions on polyelectrolyte brush surfaces", Science Advances, Jun. 3, 2016, vol. 2, N. 6, e1600345, pp. 1-8, doi: 10.1126/sciadv.1600345.

Hudait et al., "Hydrogen-Bonding and Hydrophobic Groups Contribute Equally to the Binding of Hyperactive Antifreeze and Ice-Nucleating Proteins to Ice", Journal of the American Chemical Society, Apr. 25, 2019, vol. 141, No. 19, pp. 7887-7898, doi: 10.1021/jacs.9b02248.

Jin et al., "Control of Ice Propagation by Using Polyelectrolyte Multilayer Coatings", Angewandte Chemie International Edition, Sep. 11, 2017, First Published Jul. 11, 2017, vol. 56, pp. 11436-11439, doi: 10.1002/anie.201705190.

Kim et al., "Liquid-Infused Nanostructured Surfaces with Extreme Anti-Ice and Anti-Frost Performance", ACS Nano, Jun. 10, 2012, vol. 6, No. 8, pp. 6569-6577, doi: 10.1021/nn302310q.

Kreder et al, "Design of anti-icing surfaces: smooth, textured or slippery?", Nature Reviews Materials, Jan. 11, 2016, vol. 1, No. 15003, pp. 1-15, doi: 10.1038/natrevmats.2015.3.

Kulinich et al., "How Wetting Hysteresis Influences Ice Adhesion Strength on Superhydrophobic Surfaces", Langmuir Letter, Jul. 7, 2009, vol. 25, No. 16, pp. 8854-8856, doi: 10.1021/la901439c.

Laforte et al., "State-of-the-art on power line de-icing", Atmospheric Research, Apr. 1998, vol. 46, No. 1-2, pp. 143-158, doi: 10.1016/S0169-8095(97)00057-4.

Liou et al., "Mimicry of ice structure by surface hydroxyls and water of a beta-helix antifreeze protein", Nature, Jul. 20, 2000, vol. 406, No. 6793, pp. 322-324, doi: 10.1038/35018604.

Liu et al., "Ion-specific ice propagation behavior on polyelectrolyte brush surfaces", RSC Advances, Jan. 3, 2017, vol. 7, pp. 840-844, doi: 10.1039/c6ra24847k.

Liu et al., "Janus effect of antifreeze proteins on ice nucleation", Proceedings of the National Academy of Sciences of the United States of America, Dec. 20, 2016, vol. 113, No. 51, pp. 14739-14744, doi: 10.1073/pnas.1614379114.

Lv et al., "Bio-Inspired Strategies for Anti-Icing", ACS Nano, Mar. 4, 2014, vol. 8, No. 4, pp. 3152-3169, doi: 10.1021/nn406522n.

Mishchenko et al., "Design of Ice-free Nanostructured Surfaces Based on Repulsion of Impacting Water Droplets", ACS Nano, Nov. 9, 2010, vol. 4, No. 12, pp. 7699-7707, doi: 10.1021/nn102557p.

Nutt et al., "Dual Function of the Hydration Layer around an Antifreeze Protein Revealed by Atomistic Molecular Dynamics Simulations", Journal of the American Chemical Society, Sep. 6, 2008, vol. 130, No. 39, pp. 13066-13073, doi: 10.1021/ja8034027.

Qin et al., "Bioinspired Hydrogel Interferometer for Adaptive Coloration and Chemical Sensing", Advanced Materials, May 2018, vol. 30, No. 21, e1800468, 7 pgs., doi: 10.1002/adma.201800468.

Shen et al., "Spraying Fabrication of Durable and Transparent Coatings for Anti-Icing Application: Dynamic Water Repellency, Icing Delay, and Ice Adhesion", ACS Applied Materials & Interfaces, Dec. 27, 2018, vol. 11, No. 3, pp. 3590-3598, 10.1021/acsami.8b19225.

Walker et al., "Desublimation Frosting on Nanoengineered Surfaces", ACS Nano, Jul. 12, 2018, vol. 12, No. 8, pp. 8288-8296, doi: 10.1021/acsnano.8b03554.

Wang et al., "Robust Anti-Icing Performance of a Flexible Superhydrophobic Surface", Advanced Materials, Jul. 4, 2016, vol. 28, No. 35, pp. 7729-7735, doi: 10.1002/adma.201602480.

Wong et al., "Bioinspired self-repairing slippery surfaces with pressure-stable omniphobicity", Nature, 2011, vol. 477, No. 7365, pp. 443-447, doi: 10.1038/nature10447.

Wu et al., "Heterogeneous ice nucleation correlates with bulk-like interfacial water", Science Advances, Apr. 12, 2019, vol. 5, No. 4, eaat9825, pp. 1-6, doi: 10.1126/sciadv.aat9825.

FIG. 9A
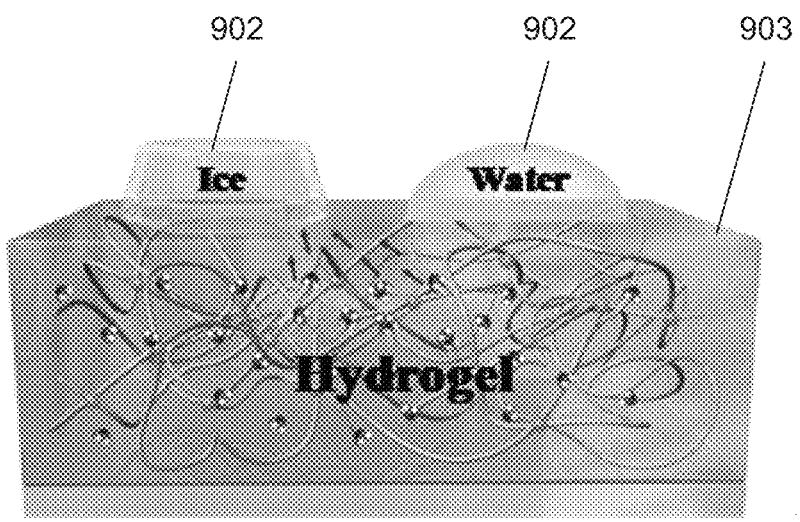
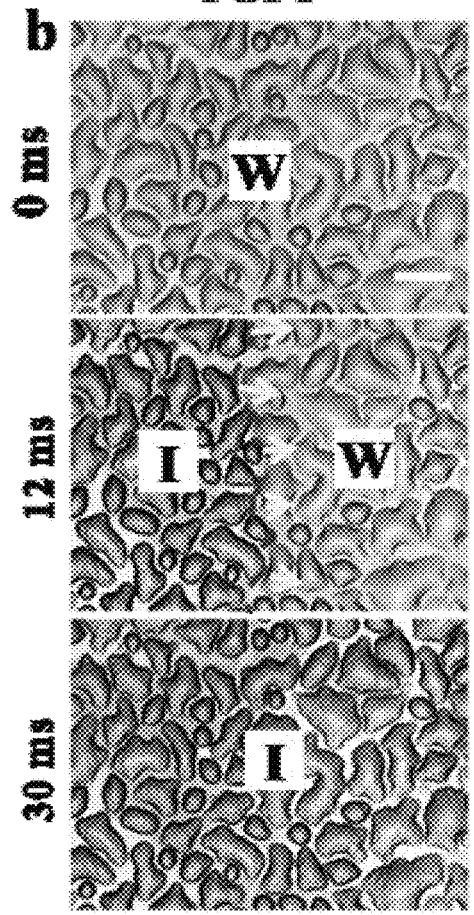
FIG. 9B
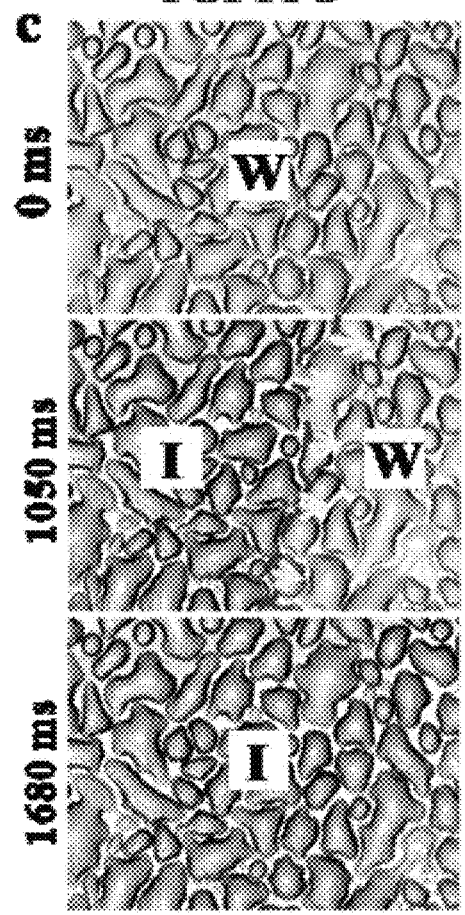
FIG. 9C

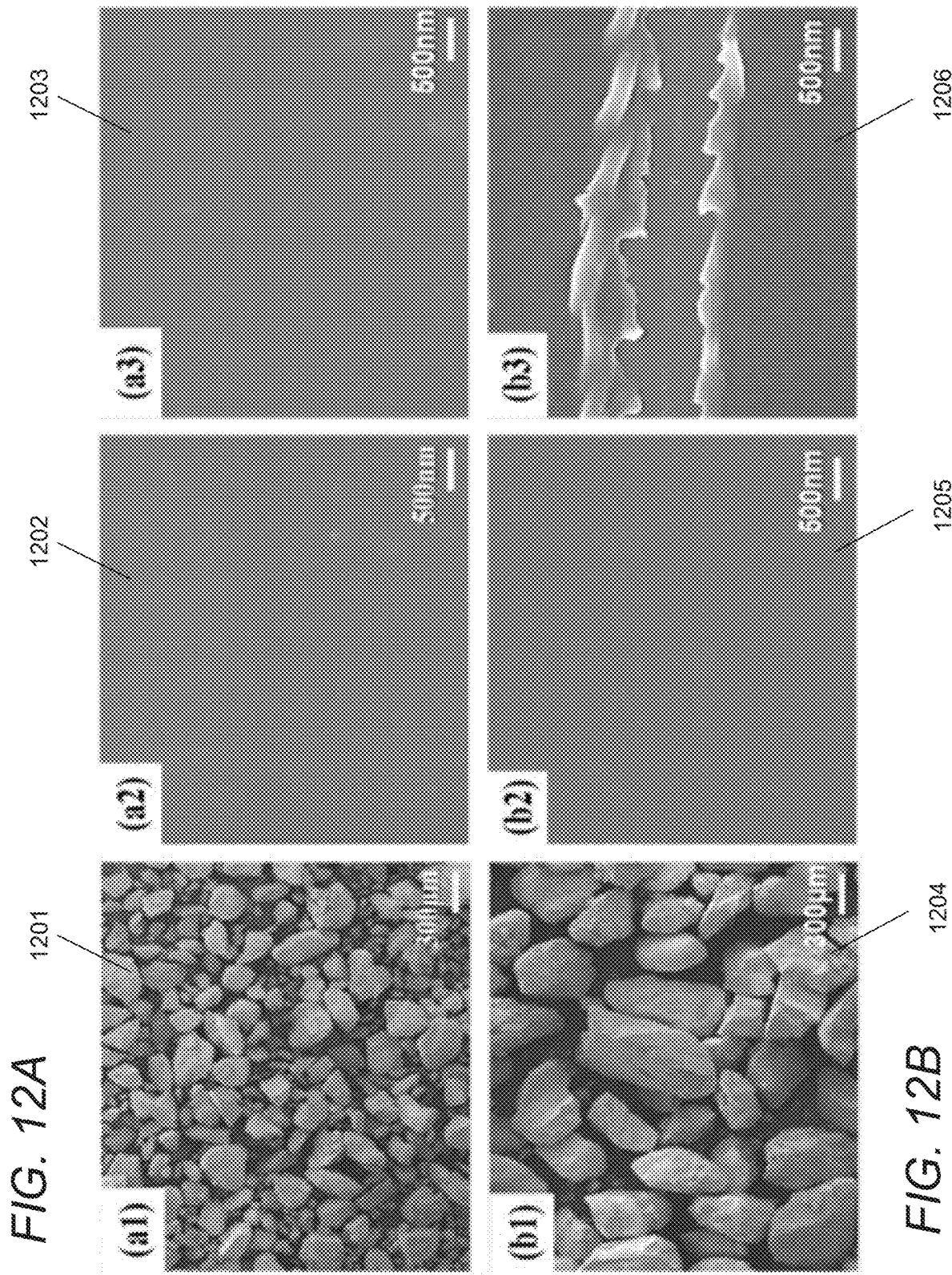

MULTI-FUNCTIONAL ANTI-ICING HYDROGEL MATERIALS AND METHODS FOR CONTROLLING ICE NUCLEATION, GROWTH AND ADHESION

CROSS-REFERENCE TO RELATED APPLICATIONS

The current application claims the benefit of priority under 35 U.S.C. § 119(e) to U.S. Provisional Patent Application No. 62/981,460 entitled "Multi-functional Anti-icing Hydrogel Materials and Methods for Controlling Ice Nucleation, Growth and Adhesion" filed Feb. 25, 2020. The disclosure of U.S. Provisional Patent Application No. 62/981,460 is hereby incorporated by reference in its entirety for all purposes.

FIELD OF THE INVENTION

The present invention generally relates to multi-functional anti-icing polyelectrolyte hydrogel coating agents and methods for their use in controlling ice nucleation, growth and adhesion.

BACKGROUND OF THE INVENTION

Undesired icing/frosting on foreign surfaces causes serious economic, energy and safety issues and environmental hazards in many fields of the society. (See, e.g., Kreder, M. J., et al., Nat. Rev. Mater. 1, 15003 (1998); He, Z., et al., Acc. Chem. Res. 51, 1082-1091 (2018); Chatterjee, R., et al., Adv. Mater. 31, e1807812 (2019); Walker, C., et al., ACS Nano 12, 8288-8296 (2018); and Boreyko, J. B., and Collier, C. P., ACS Nano 7, 1618-1627 (2013), the disclosures of which are incorporated herein by reference.) In nature, the complex and diverse ice formation processes, typically from nucleation to subsequent propagation and finally adhesion, always occur over a wide range of temperatures and environmental conditions, resulting in different ice crystals like glaze, rime, freezing rain, frost, and snow. (See, e.g., Laforte, J. L., et al., Atmos. Res. 46, 143-158 (1998); Bartels-Rausch, T., Nature 494, 27-29 (2013); Boinovich, L. B., et al., ACS Nano 13, 4335-4346 (2019); and Ahmadi, S. F., et al., ACS Appl. Mater. Interfaces 10, 32874-32884 (2018), the disclosure of which are incorporated herein by reference.) These bring a great difficulty to design icephobic materials facing different icing scenarios in practical application. (See, e.g., Lv, J., et al., ACS Nano 8, 3152-3169 (2014); Kim, P., et al., ACS Nano 6, 6569-6577 (2012); and Anand, S., et al., ACS Nano 6, 10122-10129 (2012), the disclosures of which are incorporated herein by reference.) To solve these problems, great efforts have been made to develop various anti-icing strategies for inhibiting ice nucleation, preventing ice propagation, and reducing ice adhesion. (See, e.g., Guo, Q., et al., Langmuir 34, 11986-11991 (2018); Golovin, K., and Tuteja, A., Sci. Adv. 3, e1701617 (2017); Golovin, K., et al., Sci. Adv. 2, e1501496 (2016); and Wong, T. S., et al., Nature 477 (7365), 443-447 (2011), the disclosures of which are incorporated herein by reference.)

Despite the recent rapid development of icephobic materials and methods, each focuses on a single aspect of anti-icing in certain condition and has obvious limitations for broad practical utility. For example, the superhydrophobic anti-icing surfaces exhibit excellent performance in shedding water, but the disadvantages of durability and humidity tolerance still remain. (See, e.g., Farhadi, S., et al., Appl. Surf. Sci. 257, 6264-6269 (2011); Kulinich, S. A. and Farzaneh, M., Langmuir 25, 8854-8856 (2009), the disclosures of which are incorporated herein by reference.) The ion-specificity endows the polyelectrolyte brushes unique capabilities of tuning ice nucleation and propagation; however, the poor mechanical robustness limits their application in ice removal. (See, e.g., He, Z., et al., Sci. Adv. 2, e1600345 (2016); and Liu, Z., et al., RSC Adv. 7, 840-844 (2017), the disclosures of which are incorporated herein by reference.) Though some hydrated films have ultralow ice adhesion strength due to the aqueous lubricating layer, no excellent anti-icing performance other than reducing ice adhesion has been reported. (See, e.g., Chen, J., et al., Small 10, 4693-4699 (2014); and Dou, R., et al., ACS Appl. Mater. Interfaces 6, 6998-7003 (2014), the disclosures of which are incorporated herein by reference.) Ideally, an efficient icephobic surface should possess multiple anti-icing features for tackling all above obstacles to have true versatility and optimum performance in different possible situations.

BRIEF SUMMARY OF THE INVENTION

Many embodiments are directed to anti-icing agents, and methods and systems for controlling ice nucleation, growth and adhesion using such agents.

One embodiment of the invention includes an anti-icing material comprising: a hydrophilic polyelectrolyte material containing at least one counterion, and a hydrophobic polydimethylsiloxane (PDMS), where the PDMS is cross-linked onto the polyelectrolyte material, and the anti-icing material inhibits ice nucleation, inhibits ice propagation, and reduces ice adhesion.

In a further embodiment, the anti-icing material inhibits ice nucleation at a temperature of lower than −30° C.

In another embodiment, the anti-icing material inhibits ice propagation at a time of greater than 500 s/cm$^2$.

In a yet further embodiment, the anti-icing material reduces ice adhesion strength to less than 20 kPa.

In yet another embodiment, the anti-icing material is a hydrogel.

In a further embodiment again, the hydrophilic polyelectrolyte material is poly(acrylamide-co-acrylic acid-co-N-allylacrylamide).

In another embodiment again, the anti-icing material further comprising [poly[2-(Methacryloyloxy)ethyl]trimethylammonium].

In a further additional embodiment, the PDMS has a molecular weight from 0.9 K to 13.2 K.

In another additional embodiment, the at least one counterion is selected from the group of: iodide (I$^-$), acetate (Ac$^-$), chloride (Cl$^-$), hexafluorophosphate (PF$_6^-$), SO$_4^{2-}$, and PFO$^-$.

In a still yet further embodiment, the material is deposited on a substrate selected from the group of: metal, plastic, glass, silicon, ceramic, and polymer.

In still yet another embodiment, the metal is copper, aluminum, aluminum alloy, or steel.

In a still further embodiment again, the polymer is PDMS or polyethylene.

In still another embodiment again, the anti-icing material is spin-coated onto a substrate to form a film.

In a still further additional embodiment, the film has a thickness of 53 nm.

Still another embodiment includes a method of fabricating an anti-icing coating, comprising: functionalizing a substrate with at least one vinyl group; preparing a precursor solution comprising at least one hydrophilic polyelectrolyte material, a hydrophobic polydimethylsiloxane, and an initiator; depositing the precursor solution on the substrate; and polymerizing the precursor solution on the substrate to form the anti-icing coating.

A yet further embodiment again includes the deposition of the precursor solution is by spin coating.

In yet another embodiment, the polymerization is by UV light.

In still another further embodiment, the anti-icing coating inhibits ice nucleation at a temperature of lower than −30° C.

In yet another further embodiment, the anti-icing coating inhibits ice propagation at a time of greater than 500 s/cm².

In another further additional embodiment, the anti-icing coating reduces ice adhesion strength to less than 20 kPa.

In still yet another further embodiment, the anti-icing coating is a hydrogel.

In a further embodiment, the hydrophilic polyelectrolyte material is poly(acrylamide-co-acrylic acid-co-N-allylacrylamide).

Another further embodiment again includes the anti-icing coating comprising [poly[2-(Methacryloyloxy)ethyl]trimethylammonium].

In a yet further embodiment, the PDMS has a molecular weight from 0.9 K to 13.2 K.

Yet another embodiment further includes ion exchanging the polymerized anti-icing coatings with a counterion.

In a further additional embodiment, the counterion is selected from the group of: iodide (I⁻), acetate (Ac⁻), chloride (Cl⁻), hexafluorophosphate ($PF_6^-$), $SO_4^{2-}$, and PFO⁻.

In a still yet further embodiment, the substrate is selected from the group of: metal, plastic, glass, silicon, ceramic, and polymer.

In a still further embodiment again, the metal is copper, aluminum, aluminum alloy, or steel.

In still another embodiment, the polymer is PDMS or polyethylene.

Additional embodiments and features are set forth in part in the description that follows, and in part will become apparent to those skilled in the art upon examination of the specification or may be learned by the practice of the disclosure. A further understanding of the nature and advantages of the present disclosure may be realized by reference to the remaining portions of the specification and the drawings, which forms a part of this disclosure.

BRIEF DESCRIPTION OF THE DRAWINGS

The description will be more fully understood with reference to the following figures, which are presented as exemplary embodiments of the invention and should not be construed as a complete recitation of the scope of the invention, wherein:

FIGS. 9a to 9e illustrate: a) ice propagation on the anti-icing hydrogel surface in accordance with an embodiment, time-resolved optical microscopic images of ice propagation in accordance with an embodiment on: b) PG1-I and c) PG1-PFO hydrogel surfaces where the scale bar is 100 µm. 'I' is ice and 'W' is water, d) a data graph of the change of fraction of frozen droplets on various anti-icing hydrogel surfaces with different counterions vs ice propagation time in accordance with an embodiment, and e) a data graph of the ice propagation rate on various anti-icing hydrogels with counterions of I⁻, $SO_4^{2-}$, and PFO⁻ in accordance with an embodiment.

FIGS. 12a and 12b illustrate scanning electron microscopy (SEM) images of PG1-PFO hydrogel surface morphologies in accordance with an embodiment after different mechanical abrasion tests with a) fine sand (particle diameter is smaller than ~300 μm), and b) coarse sand (particle diameter is about 800-300 μm), where the morphologies of a1) fine sand and b1) coarse sand where the morphologies of PG1-PFO hydrogel surface 2) before and 3) after mechanical abrasion tests with different sands.

DETAILED DESCRIPTION OF THE INVENTION

Figure 1A:
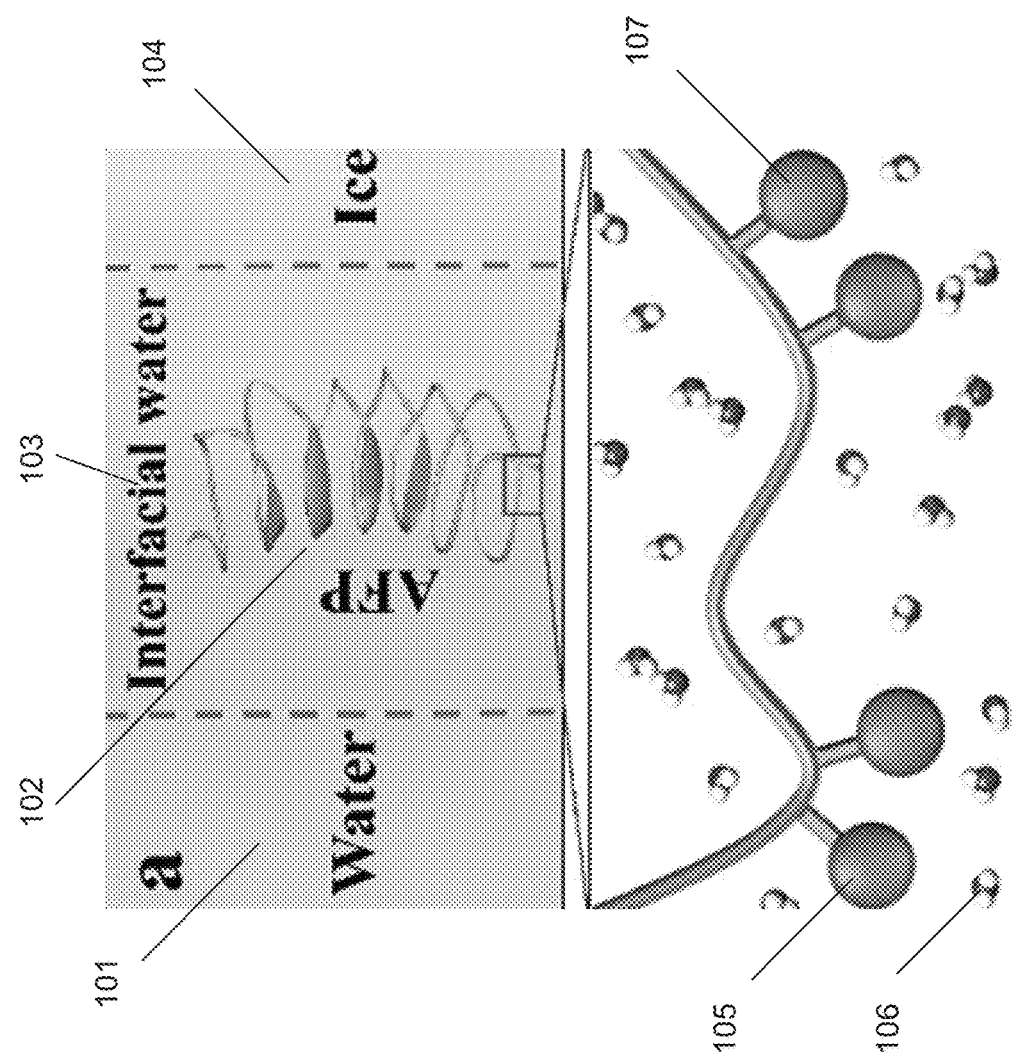
FIGS. 1a to 1d illustrate: a) hydrogen-bonding and hydrophobic groups of AFPs in accordance with the prior art, b) multifunctional anti-icing agents capable of controlling ice nucleation, ice propagation and ice adhesion via tuning structure, mobility and amount of interfacial water in accordance with an embodiment, c) chemical structures of poly (AAm-co-AAc-co-AAene) hydrogels cross-linked by NG (PMETA), SG (PMETA-co-PDMS), PG1 [(PMETA)-g-(PDMS-0.9K)], PG2 [(PMETA)-g-(PDMS-5.7K)], and PG3 [(PMETA)-g-(PDMS-13.2K)], respectively in accordance with an embodiment, and d) XPS spectra of various PDMS-grafted polyelectrolyte hydrogels and the PG1 surface with different counterions in accordance with an embodiment.

Turning now to the drawings and data, highly efficient, multi-functional anti-icing compositions and methods of their use are described. Many embodiments provide anti-icing platforms based on hydrogels. In several embodiments, anti-icing hydrogels can simultaneously inhibit ice nucleation, prevent ice growth, and reduce ice adhesion. Some embodiments combine hydrogen bonding and hydrophobic groups to regulate interfacial water to achieve anti-icing functions. The properties of interfacial water can be controlled by tuning the synergy of hydrophobicity and ion specificity in such anti-icing agents in accordance with certain embodiments, in contrast with the conventional wholly hydrophobic bulk systems (for example, polydimethylsiloxane). Several embodiments implement at least one hydrophobic polymer and at least one hydrophilic polyelectrolyte in anti-icing hydrogels. Various embodiments of such multifunctional anti-icing platforms are based on polydimethylsiloxane (PDMS)-grafted polyelectrolyte hydrogels. In several embodiments, grafting hydrophobic PDMS chains onto a hydrophilic polyelectrolyte network containing various counterions can form a multifunctional hybrid anti-icing hydrogel.

Several embodiments allow for the integration of various icephobic advantages into one material. In many embodiments, the controllability of interfacial water enables the polyelectrolyte hydrogel coating to inhibit ice nucleation, prevent ice propagation, and reduce ice adhesion at the same time. In some embodiments, ice nucleation temperature of anti-icing hydrogels can be lower than −30° C. Certain embodiments provide that ice nucleation temperature can be lower than −32° C. Several embodiments provide freezing temperature of anti-icing hydrogels to be about −31° C. Some embodiments provide that freezing temperature can be about −35° C. Certain embodiments provide a wide freezing temperature window of up to 12° C. of anti-icing hydrogels. A number of embodiments provide a freezing temperature window of up to 15° C.

Many embodiments provide that anti-icing hydrophilic hydrogels can prevent ice propagation. In several embodiments, ice propagation rate can be lower than 0.002 cm$^2$/s. Certain embodiments provide that ice propagation rate can be lower than 0.001 cm$^2$/s. Some embodiments provide ice propagation time for anti-icing hydrogel coatings can be higher than 500 s/cm$^2$. Several embodiments provide that ice propagation time can be higher than 1000 s/cm$^2$.

Several embodiments provide that anti-icing hydrogels can reduce ice adhesion. In some embodiments, ice adhesion strength can be lower than 20 kPa. Several embodiments provide that ice adhesion strength can be lower than 10 kPa. Certain embodiments provide ice adhesion strength is about 11 kPa. Some embodiments provide that ice adhesion strength is about 5 kPa.

A number of embodiments exhibit that anti-icing hydrogels have anti-icing performances in real-life environments. In several embodiments, ice formation at 25° C. can be delayed more than 1 hour in real-life environment with anti-icing hydrogel coatings. In some embodiments, ice formed on anti-icing hydrogel coatings can be blown off by a breeze with about 2 m/s wind speed within 2 s. In certain embodiments, ice formed on anti-icing hydrogel coatings can be blown off by a breeze with about 1 m/s wind speed within 1 s.

Many embodiments implement low-cost anti-icing hydrogel coatings on various inorganic and/or organic materials. Examples of compatible substrate materials for anti-icing hydrogel coatings include (but are not limited to): metal, plastic, oxide, and ceramic. Coatings can be applied in large scale in accordance with several embodiments. A number of embodiments provide that thickness of coatings can be tuned. Some embodiments implement one-step photopolymerization spin coating to fabricate anti-icing hydrogel coatings. Many embodiments comprise hydrogel anti-icing agents configured to form thin film coatings on various surfaces via spin coating under UV irradiation. The simplicity, mechanical durability, and versatility of the smooth hydrogel surfaces in accordance with embodiments allow for a wide range of anti-icing applications.

Antifreeze Proteins and Anti-Icing Materials

The ice formation processes on solid surfaces are complex and diverse, which makes it a challenge to design an icephobic material functional under different icing conditions in complex varying real-life environment. Biological antifreeze proteins (AFPs) offer a great example of multi-function integrated anti-icing materials that excel in all the three key aspects of anti-icing process: depress the freezing temperature, prevent the ice growth, and inhibit the ice recrystallization simultaneously by tuning the structures and dynamics of interfacial water.

Creating low-cost, large-scale, high-efficiency and multifunctional anti-icing material is still a challenge, and few strategies for accomplishing this have been demonstrated. (See, e.g., Golovin, K., et al., Science 364, 371-375 (2019); Wu, S., et al., Sci. Adv. 5, eaat9825 (2019); and Shen, Y., et al., ACS Appl. Mater. Interfaces 11, 3590-3598 (2018), the disclosure of which are incorporated herein by reference.) However, nature offers examples of the multifunction integrated anti-icing control, i.e., antifreeze proteins (AFPs) control ice formation via depressing the freezing temperature, preventing ice growth, and inhibiting ice recrystallization. (See, e.g., DeVries, A. L., and Wohlschlag, D. E., Science 163, 1073-1075 (1969), the disclosure of which is incorporated herein by reference.) It is reported that all these superior anti-freeze functions can be achieved through tuning the structure, mobility and amount of interfacial water, which respectively regulate the ice nucleation, growth and adhesion. (See, e.g., Nutt, D. R., and Smith, J. C., J. Am. Chem. Soc. 130, 13066-13073 (2008); Liou, Y. C., et al., Nature 406, 322-324 (2000); and Liu, K., et al., Proc. Natl. Acad. Sci. U.S.A. 113, 14739-14744 (2016), the disclosures of which are incorporated herein by reference.) Both hydrogen-bonding and hydrophobic groups contribute to the regulation of interfacial water, thus leading to the AFPs with enhanced antifreeze activity. (See, e.g., Hudait, A., et al., J. Am. Chem. Soc. 141, 7887-7898 (2019), the disclosure of which is incorporated herein by reference.)

Recent anti-icing approaches further reinforce the significance of interfacial water in inhibiting ice formation and reducing ice adhesion. For example, the ions at polyelectrolyte brush interface can effectively control the dynamics of interfacial water and thus determine the ice nucleation and propagation processes. Moreover, the ice adhesion strength can be effectively reduced with the aqueous lubricating layer on various hydrated surfaces. (See, e.g., Chen, J., et al., ACS Appl. Mater. Interfaces 5, 4026-4030 (2013), the disclosure of which is incorporated herein by reference.) Many embodiments provide that realizing the regulation of all the three aspects of anti-icing with one material simultaneously would integrate a balance of the optimum structures, mobility, and amount of interfacial water.

Many embodiments are directed to anti-icing compositions and methods that regulate the properties of interfacial water by incorporating and balancing the hydrophilic and hydrophobic components in the materials. Regulation of ice nucleation, growth and adhesion simultaneously is a big challenge as it would integrate hydrophilic and hydrophobic synergy at molecular scale within one material. Herein, several embodiments combine hydrogen-bonding and hydrophobic groups for the multiple antifreeze activities. By contrast, conventional pure hydrophobic systems without interfacial water present mainly facilitates ice adhesion but not nucleation and propagation effectively. Some embodiments graft hydrophobic chains with tunable lengths on hydrophilic charged networks. Such embodiments allow for regulating the properties of interfacial water via tuning the synergy of hydrophobicity and ion-specificity. Several embodiments provide the PDMS-grafted polyelectrolyte hydrogel coatings with high capabilities of tuning the ice nucleation, propagation and adhesion. The non-structured feature makes these smooth anti-icing surfaces more environmentally tolerant, mechanically robust and durable.

Anti-Icing Agents

AFPs have unique capabilities to regulate ice formation process via selectively adsorbing to the ice crystal surface. A schematic of hydrogen-bonding and hydrophobic groups of AFPs is illustrated in FIG. 1a. AFP (102) is positioned in interfacial water (103), between the water (101) and the ice (104). AFP (102) comprises of charged groups (105) and hydrophobic groups (107) on its backbone. Interfacial water molecules (106) surround the AFP. The multiple anti-freezing functions of AFPs are strongly influenced by interfacial water (106) at the AFP/ice interface (103), which can be controlled via tuning the arrangement of hydrophobic and charged functional groups.

Figure 1B:
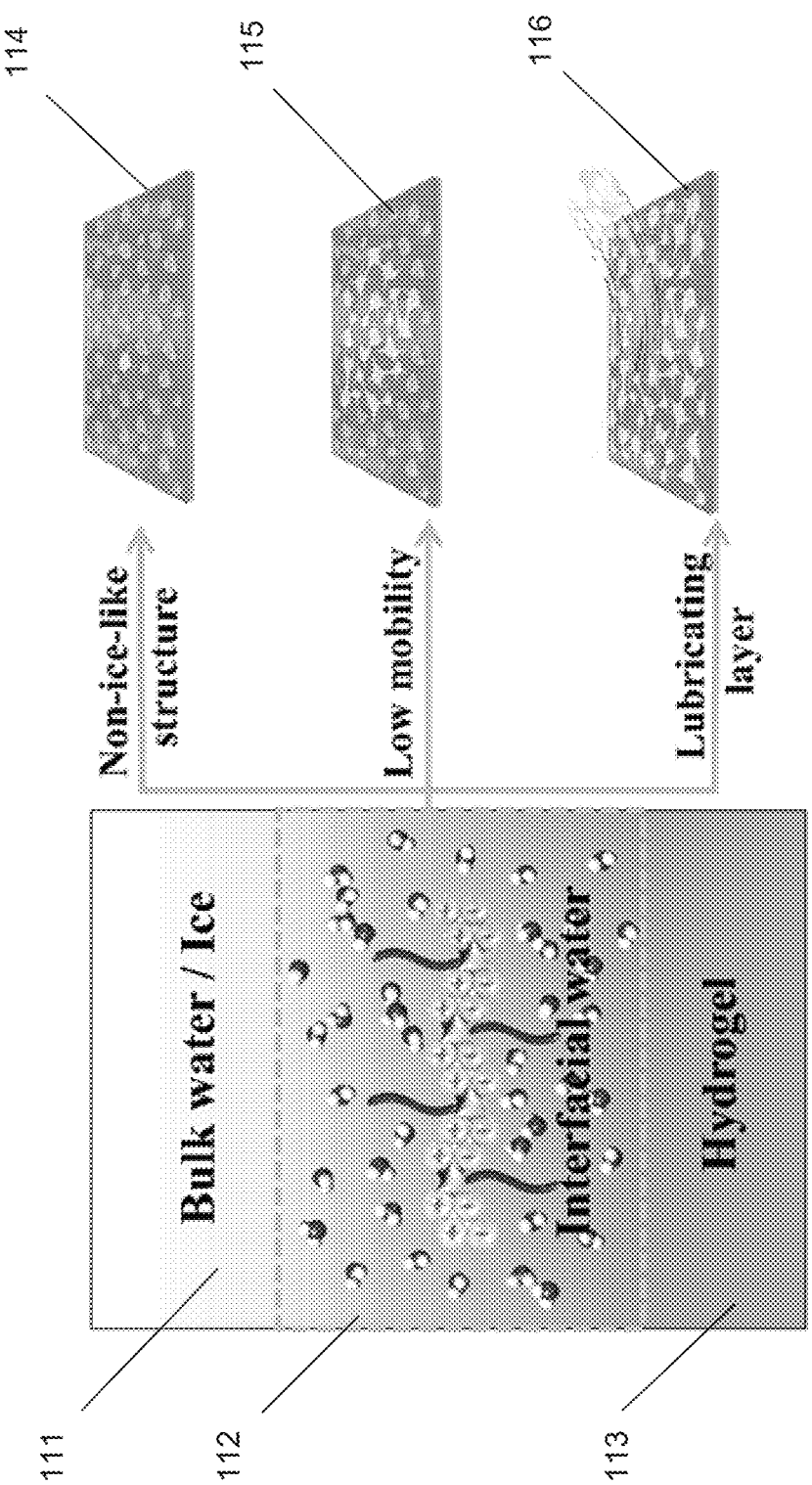

Many embodiments implement multifunctional anti-icing hydrogel surface via controlling the interfacial water properties. Several embodiments provide multifunctional anti-icing agents capable of controlling ice nucleation, ice propagation and ice adhesion via tuning structure, mobility and amount of interfacial water. In some embodiments, anti-icing hydrogels can simultaneously 1) tune heterogeneous ice nucleation temperature to record-low level and in a broad range, 2) suppress ice propagation rate, and 3) have ultra-low ice adhesion strength. Several embodiments realize the three functions with a single material, namely simultaneously inhibiting ice nucleation, preventing ice propagation, and decreasing ice adhesion. The three functions are the three key processes of ice formation. Most anti-icing materials and/or methods can address only one or two of the three aspects. A schematic of structural components of anti-icing agents in accordance with an embodiment of the invention is illustrated in FIG. 1b. The anti-icing hydrogel (113) possess anti-icing properties tuning interfacial water (112) properties when in contact with ice and/or bulk water (111). The interfacial water (112) has non-ice-like structures, hence inhibiting ice nucleation (114). The interfacial water (112) has low mobility, hence preventing ice propagation (115). The interfacial water (112) can act as a lubricating layer, hence reducing ice adhesion (116).

Figure 1C:
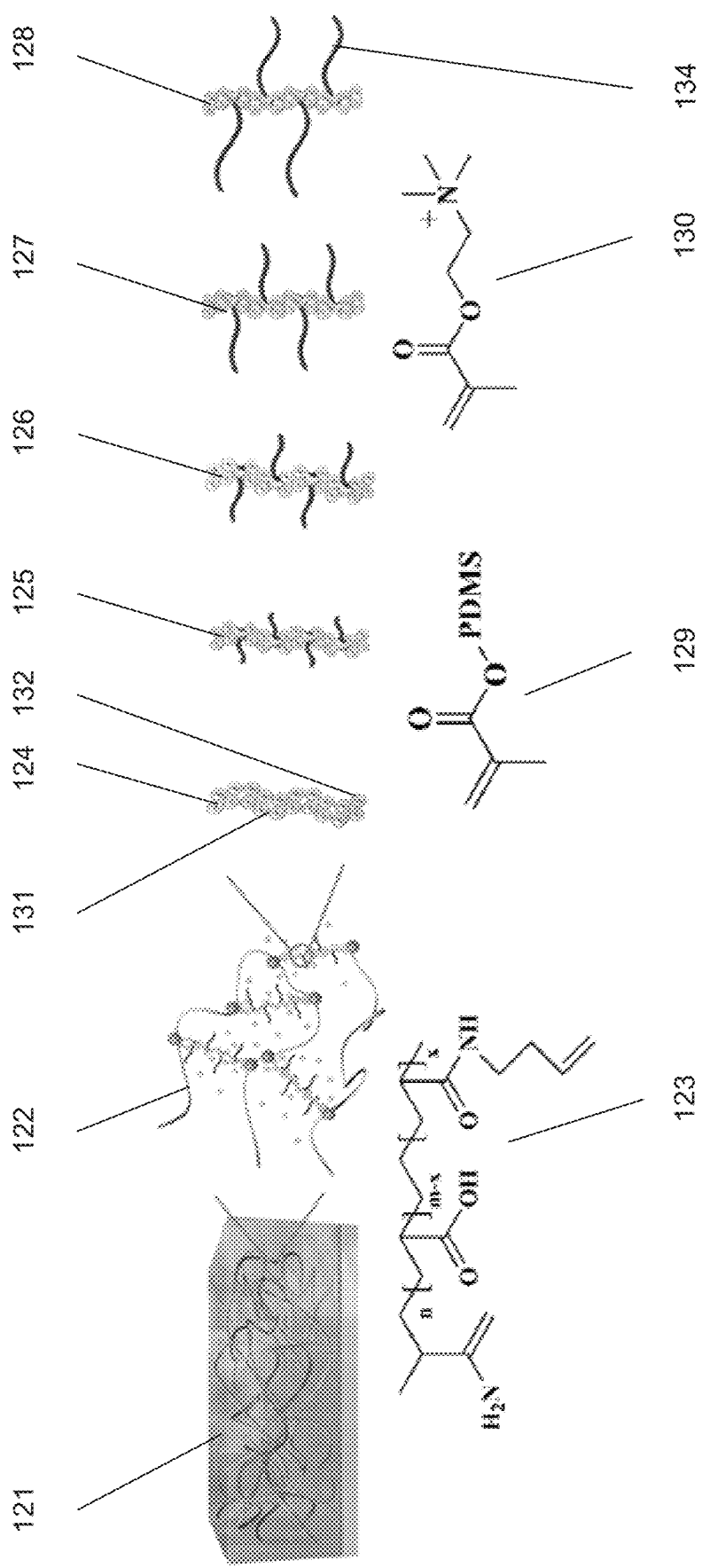

Many embodiments provide an all-around anti-icing material with comprehensive performances on all three aspects including the ice nucleation inhibition, the ice propagation prevention, and the ice adhesion reduction. Hydrogel, which contains different types of interfacial water, provides a platform for tuning interfacial water structure, mobility, and amount, based on chemical modifications in accordance with some embodiments. Examples of hydrogels include (but are not limited to): standard hydrogels, double-network hydrogels, inorganic/hydrogel hybrids, and hydrogel fibers. In several embodiments, the polymer network of the poly (acrylamide-co-acrylic acid-co-N-allylacrylamide) (poly (AAm-co-AAc-co-AAene)) hydrogels can offer a scaffold to carry hydrophobic groups and charged groups. A schematic of hydrogel scaffold incorporating hydrophobic and charged groups in accordance with an embodiment of the invention is illustrated in FIG. 1c. An anti-icing hydrogel (121) with a poly(AAm-co-AAc-co-AAene) scaffold (122) can be cross-linked with various hydrophobic groups and charged groups. 123 shows the chemical structure of poly(AAm-co-AAc-co-AAene) scaffold (122). The poly(AAm-co-AAc-co-AAene) hydrogel can be cross-linked with PMETA (124), referenced as NG. PMETA comprises cation groups (132) and anion groups (131). The cations can be META (130). The anions can include (but not limited to): iodide ($I^-$), chloride ($Cl^-$), hexafluorophosphate ($PF_6^-$, $SO_4^{2-}$, $PFO^-$. The poly(AAm-co-AAc-co-AAene) hydrogel can be cross-linked with PMETA and various molecular weights of PDMS from 0.9 K, 5.7 K, to 13.2 K. The poly(AAm-co-AAc-co-AAene) hydrogel can be cross-linked with PMETA-co-PDMS (125), referenced as SG. PDMS (129) is a hydrophobic group. The poly(AAm-co-AAc-co-AAene) hydrogel can be cross-linked with PMETA and 0.9 K PDMS, (PMETA)-g-(PDMS-0.9K) (126), referenced as PG1. The poly(AAm-co-AAc-co-AAene) hydrogel can be cross-linked with PMETA and 5.7 K PDMS, (PMETA)-g-(PDMS-5.7K) (127), referenced as PG2. The poly(AAm-co-AAc-co-AAene) hydrogel can be cross-linked with PMETA and 13.2 K PDMS, (PMETA)-g-(PDMS-13.2K) (128), referenced as PG3.

Figure 1D:
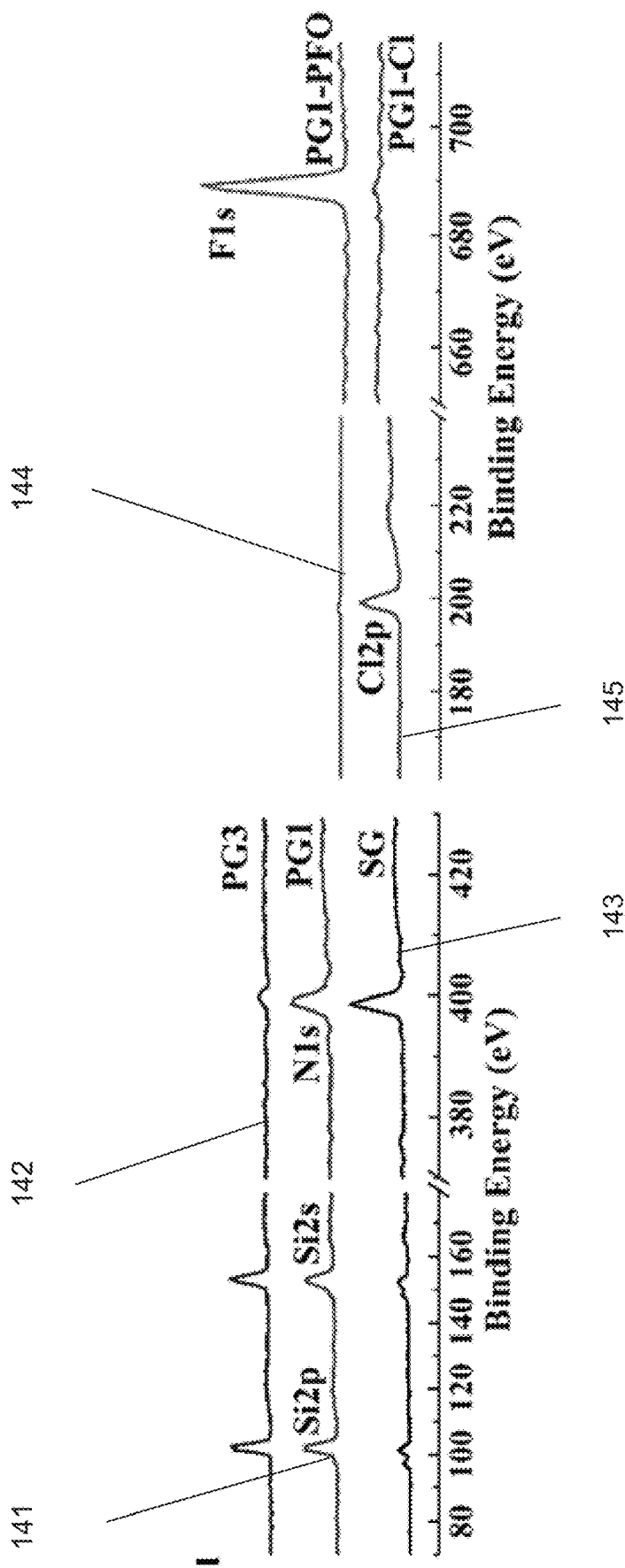

In many embodiments, the PDMS-grafted electrolyte hydrogel possess structures and properties that endow anti-icing functions. In several embodiments, the PDMS chains can balance the hydrophilic matrix to regulate the interfacial water. In some embodiments, the PDMS chains can strengthen the intrinsic mechanically-weak hydrogel. In comparison, the conventional bulk PDMS-based anti-icing materials mainly utilize its hydrophobicity to repel water. The balance of ion-specificity and the hydrophobicity enables the hydrogel to regulate the interfacial water to an optimum state and leads to the anti-icing performance in accordance with certain embodiments. Many embodiments provide improved anti-icing performance including (but not limited to): freezing temperature, operation window and condition, from the pure bulk PDMS and polyelectrolyte surfaces. Several embodiments provide x-ray photoelectron spectroscopy (XPS) spectra confirming the copolymerization and ion exchange of the hydrogel. XPS spectra of various PDMS-grafted polyelectrolyte hydrogels and the PG1 surface with different counterions in accordance with an embodiment if the invention are shown in FIG. 1d. XPS spectrum of PG3 is shown in 142, PG1 in 141, and SG in 143. XPS spectrum of PG1 surface with $PFO^-$ counterion is shown in 144. PG1 surface with $Cl^-$ counterion is shown in 145.

Figure 2A:
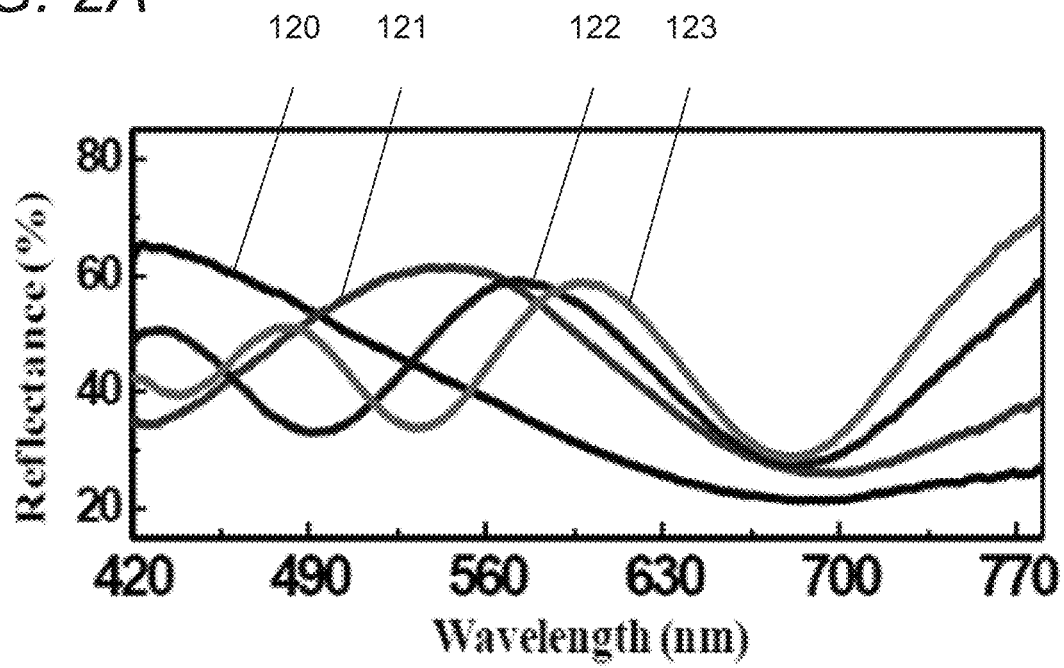
FIG. 2a illustrates a data graph of the film thickness of PG1 detected by reflective spectra in accordance with an embodiment.

Many embodiments provide that the hydrogel can be in a form of a thin film. The thin film of hydrogel can be covalently linked to various substrates. The film thickness can be identified through the surface color change due to the optical interference effect in accordance with several embodiments. A schematic of reflectance of different thickness PG1 hydrogel films in accordance with an embodiment of the invention is illustrated in FIG. 2a. Hydrogel film of about 117 nm thick (120) shows highest reflectance at around 420 nm wavelength. Hydrogel film of about 363 nm thick (121) shows highest reflectance at around 530 nm wavelength. Hydrogel film of about 575 nm thick (122) shows peak reflectance at around 560 nm and 770 nm wavelengths. Hydrogel film of about 816 nm thick (123) shows peak reflectance at around 600 nm and 480 nm wavelengths. Some embodiments provide that the film thickness of hydrogel films can be detected by reflective spectra.

Figure 2B:
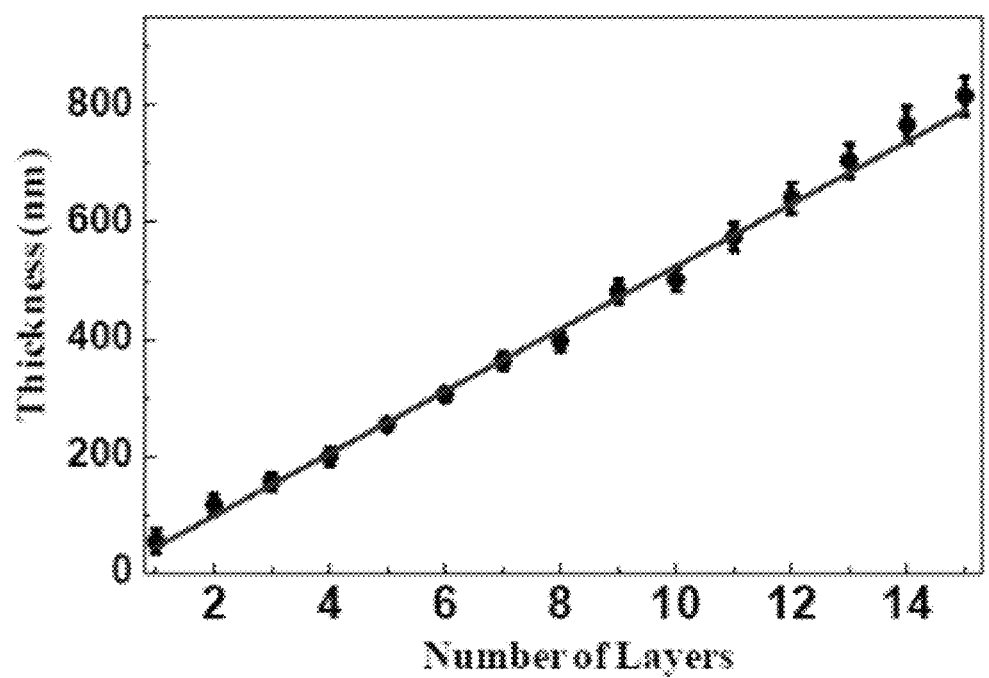
FIG. 2b illustrates a data graph of the variation of film thickness vs. the number of spin-coated hydrogel layers in accordance with an embodiment.

In some embodiments, the thin film of hydrogel has nanometer-scale tunable thickness ranging from about 10 nm to about 1000 nm. Several embodiments provide that a single layer of spin-coated hydrogel film can be about 10 nm in thickness. A schematic of total thickness of hydrogel film at various layers in accordance with an embodiment of the invention is illustrated in FIG. 2b. A single layer of spin-coated hydrogel film can be about 53 nm in thickness. The total thickness of hydrogel film can be tuned by controlling number of layers of the hydrogel film. The total thickness can range from about 50 nm (about a single layer) to about 800 nm (about 16 layers).

Methods of Fabricating Anti-Icing Agents

Many embodiments provide methods for forming anti-icing agents. Several embodiments implement the copolymerization of cationic groups and hydrophobic groups of different molecular weights. Some embodiments form anti-icing hydrogel by crosslinking various graft lengths and compositions. In various embodiments, the copolymerization of cationic [2-(methacryloyloxy)ethyl]trimethylammonium (META) monomer and monomethacrylate-functional polydimethylsiloxane (PDMS) macromonomers of different chain length can be carried out using in-situ photopolymerization method, forming crosslinks of a series of different graft lengths and compositions.

Figure 3:
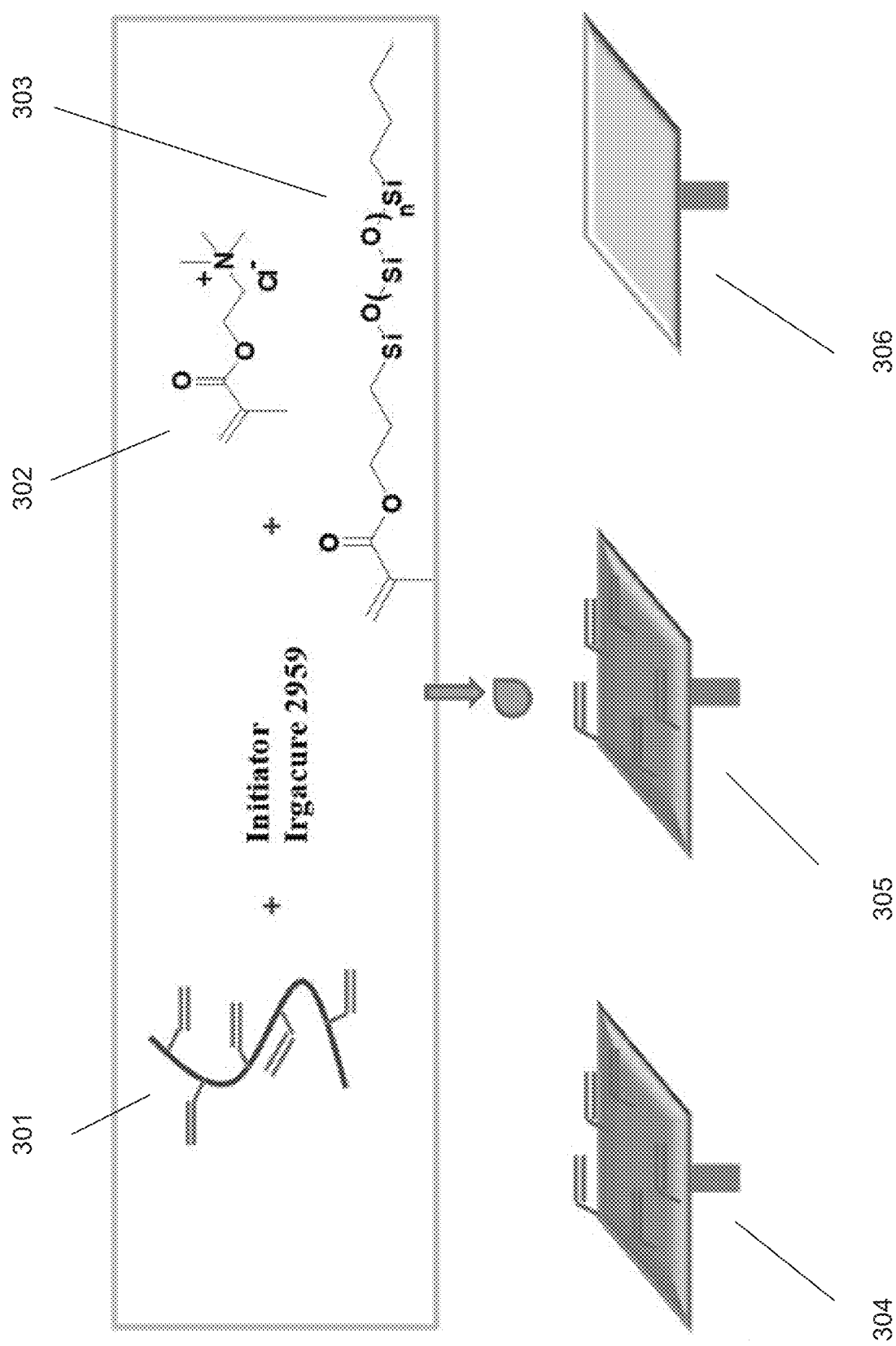
FIG. 3 illustrates a process for fabrication of anti-icing PDMS-grafted polyelectrolyte hydrogel surface in accordance with an embodiment.

Fabrication process of anti-icing PDMS-grafted polyelectrolyte hydrogel surface in accordance with an embodiment of the invention is illustrated in FIG. 3. A substrate surface can be vinyl-functionalized (304). A hydrogel scaffold poly (AAm-co-AAc-co-AAene) (301) can be mixed with a precursor (initiator Irgacure 2959) and ionic groups and hydrophobic PDMS groups. The poly(AAm-co-AAc-co-AAene) hydrogels (301) can be cross-linked with META and $Cl^-$ (302), and PDMS of various chain lengths (303). The mixture solution can be spin coated on to the vinyl functioned surface (305). A UV-assisted polymerization can crosslink the PDMS-grafted polyelectrolyte hydrogel (306) and form a thin film on the substrate.

In several embodiments, the bioinspired polyelectrolyte hydrogel can be fabricated via spin-coating under UV illumination. In some embodiments, the PDMS-grafted polyelectrolyte hydrogels can be fabricated via in situ polymerization and washed with Milli-Q water and alcohol to remove the unreacted precursor. The whole process in accordance with many embodiments can be divided into four steps:

Substrates are vinyl-functionalized by soaking in the dopamine methacrylamide (DMA) solution (pH~8.5) for 24 h, and modified with TMSPMA.

Precursor solution is prepared, containing 2 wt % poly (AAm-co-AAc-co-AAene), 0.5 wt % PMETAC, 0.5 wt % mono-methacryloxypropyl terminated PDMS with various molecular weights, and 0.3% initiator of Irgacure 2959 in 50% acetic acid/water solution.

Prepared precursor solution of hydrogel is spin-coated onto silicon substrate with UV exposure. The samples are further washed with Milli-Q water and alcohol to remove the unreacted precursor.

The $Cl^-$ in PMETAC monomer is exchanged by immersing the hydrogel samples into 0.5-M salt solutions of target counter anions for 30 min. The films are then washed with Milli-Q water to remove excess free salts on the surface. The success of counterion exchange can confirmed by measurements of XPS.

Figure 4:
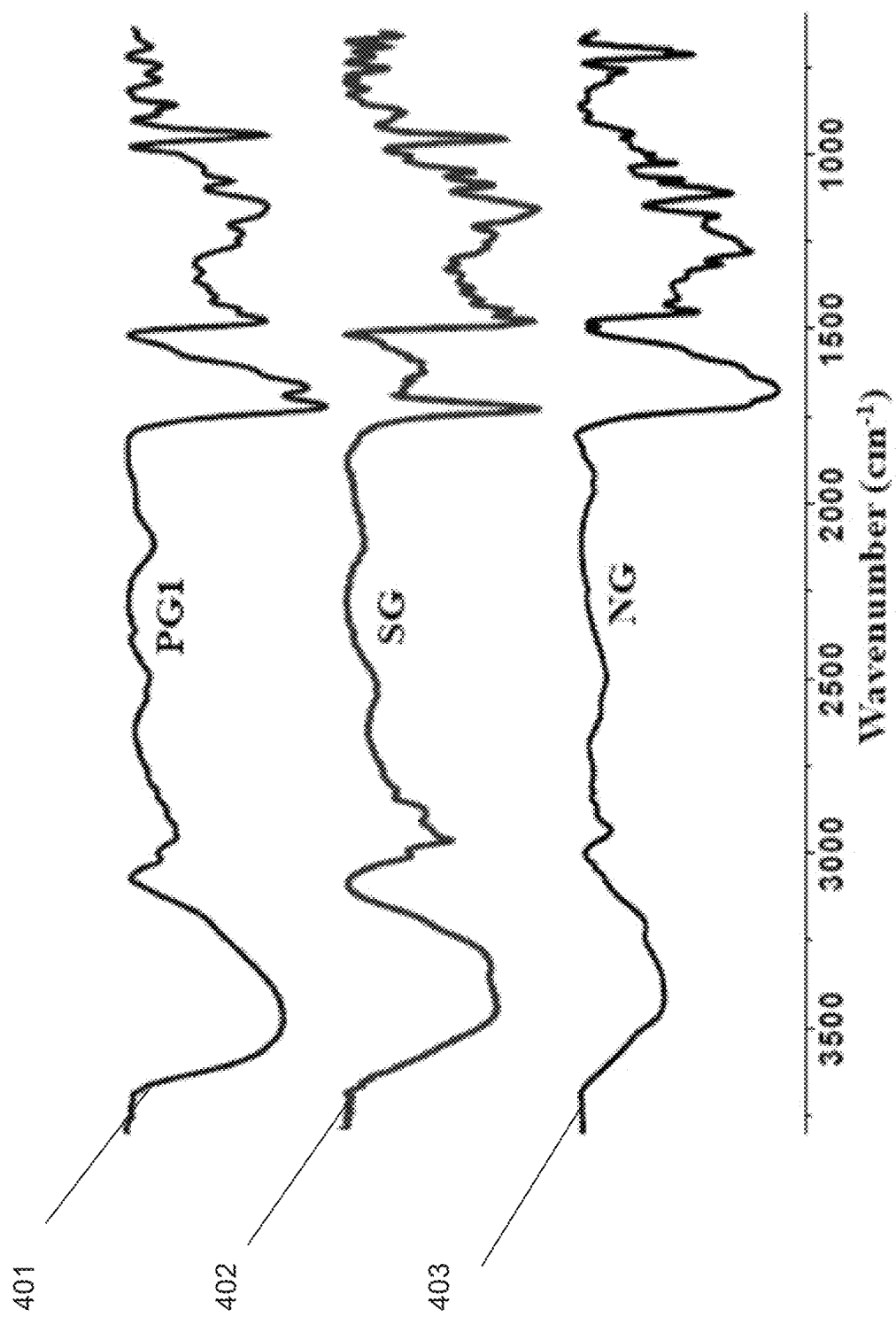
FIG. 4 illustrates an FTIR spectra of various PDMS-grafted polyelectrolyte hydrogel in accordance with an embodiment.

In many embodiments, the poly(AAm-co-AAc-co-AAene) hydrogels can be cross-linked by NG [poly[2-(Methacryloyloxy)ethyl]trimethylammonium (PMETA)], SG (PMETA-co-PDMS), PG1 [(PMETA)-g-(PDMS-0.9K)], PG2 [(PMETA)-g-(PDMS-5.7K)] and PG3 [(PMETA)-g-(PDMS-13.2K)], respectively. FTIR can be used to identify the formation of cross-linked products in accordance with some embodiments. FTIR spectra of various PDMS-grafted polyelectrolyte hydrogel in accordance with an embodiment of the invention is illustrated in FIG. 4. FTIR spectrum of PG1 is shown in 401, SG is shown in 402, and NG is shown in 403.

Many embodiments implement a modular design to form anti-icing hydrogels. In several embodiments, the hydrogel scaffold can be grafted with various lengths of PDMS chains. In some embodiments, the poly(AAm-co-AAc-co-AAene) hydrogels are cross-linked by NG [poly[2-(Methacryloyloxy)ethyl]trimethylammonium (PMETA)], SG (PMETA-co-PDMS), PG1 [(PMETA)-g-(PDMS-0.9K)], PG2 [(PMETA)-g-(PDMS-5.7K)] and PG3 [(PMETA)-g-(PDMS-13.2K)], respectively. With modular design of the polyelectrolyte hydrogel film possesses, the embedded counterions in the hydrogel can be easily exchanged in accordance with several embodiments. Some embodiments provide a tunable microenvironment of ion-specificity. Certain embodiments provide that the surface hydrophobicity can be readily controlled with the incorporation of various hydrophobic grafted-PDMS segments.

Figure 5:
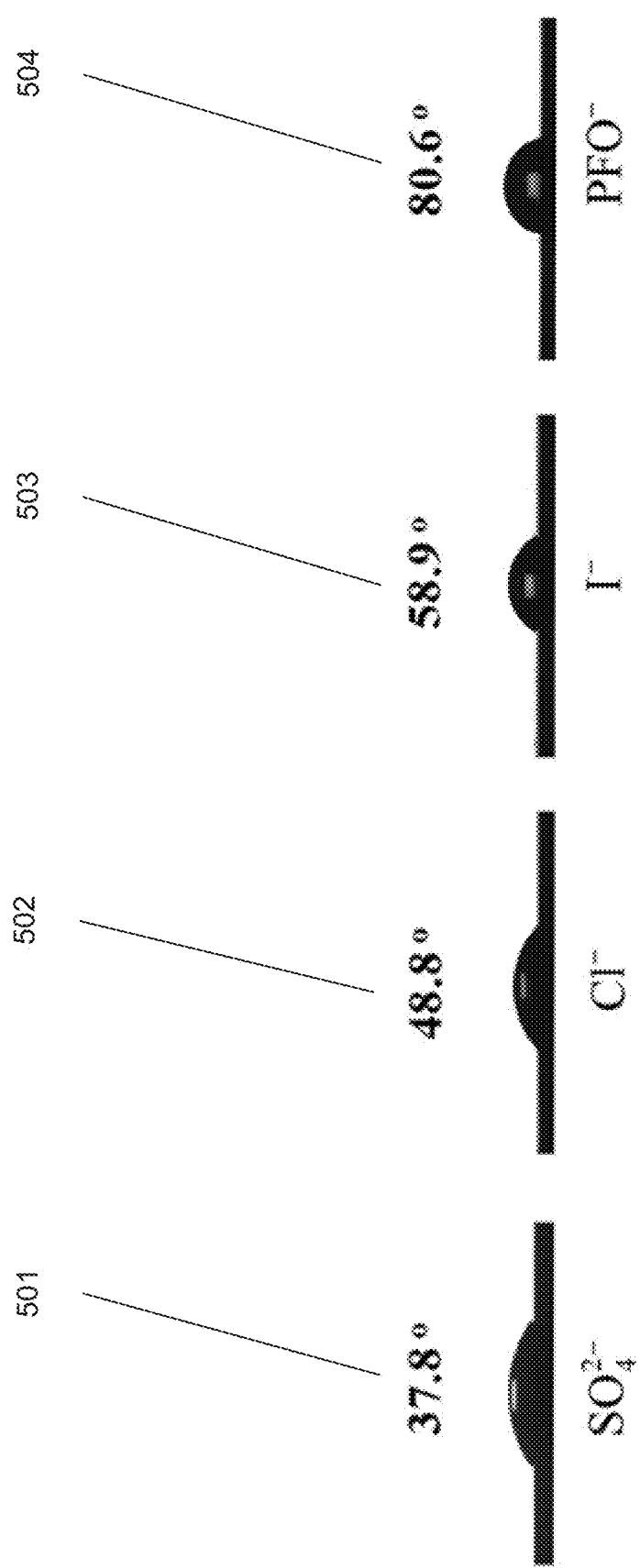
FIG. 5 illustrates static contact angles of PG1 hydrogel surfaces with different counterions in accordance with an embodiment.

In several embodiments, anions including (but not limited to): iodide (I⁻), chloride (Cl⁻), hexafluorophosphate ($PF_6^-$, sulfate ($SO_4^{2-}$), PFO⁻, can be mixed with anti-icing hydrogel. Some embodiments provide that various counterions enable different surface hydrophobicity. Hydrophobicity can be measured with contact angles. The greater the contact angles, the more hydrophobic of the surface. Static contact angles of PG1 hydrogel surfaces with different counterions in accordance with an embodiment of the invention is illustrated in FIG. 5. PG1 mixed with $SO_4^{2-}$ (501) has a static contact angle of about 37.8°. PG1 mixed with Cl⁻ (502) has a static contact angle of about 48.8°. PG1 mixed with I⁻ (503) has a static contact angle of about 58.9°. PG1 mixed with PRY (504) has a static contact angle of about 80.6°.

Many embodiments provide an effective icephobic surface with multiple anti-icing functions through simple design and large-scale production. Several embodiments provide an effective route to integrate advantages of various icephobic materials into the PDMS-grafted polyelectrolyte hydrogels. Anti-icing performances can be achieved by tuning the properties of interfacial water. Some embodiments provide methods to introduce hydrophilic electrolyte and hydrophobic PDMS macromonomers into PG hydrogel coating. The tunable synergy of hydrophobicity and ion-specificity in accordance with certain embodiments can enable PG1-PFO hydrogel composite surface with high capabilities of tuning ice nucleation, propagation, and adhesion. A number of embodiments show that these multifunctional anti-icing surfaces can delay the ice formation remarkably without altering its original ultralow ice adhesion. Many embodiments provide the broad applicability on a wide range of substrates. The broad applications of anti-icing coatings open up more opportunities for multifunctional anti-icing hydrogel to become coatings with icephobicity.

Exemplary Embodiments

Although specific embodiments of compositions, methods and process are discussed in the following sections it will be understood that these embodiments are provided as exemplary and are not intended to be limiting.

Materials and Methods

Materials. Materials used to fabricate anti-icing hydrogel include: [2-(Methacryloyloxy)ethyl]trimethylammonium chloride (PMETAC), sodium hexafluorophosphate, sodium perchlorate, sodium perfluorooctanoate, bis(trifluoromethane) sulfonamide lithium, sodium iodide, sodium sulfate, sodium bromide, sodium acetate, 2-hydroxy-4'-(2-hydroxyethoxy)-2-methylpropiophenone (Irgacure 2959), 3-(Trimethoxysilyl)propyl methacrylate (TMSPMA), mono-methacryloxypropyl terminated polydimethylsiloxane (PDMS) with various molecular weights, and the polymer of poly(AAm-co-AAc-co-AAene). Substrate includes silicon wafers.

Fabrication of polydimethylsiloxane (PDMS)-grafted polyelectrolyte hydrogel. The precursor solution contained 2% wt poly(AAm-co-AAc-co-AAene), 0.5% wt PMETAC, 0.5% wt mono-methacryloxypropyl terminated PDMS with various molecular weights, 0.3% initiator of Irgacure 2959 in 50% acetic acid/water solution. The prepared precursor solution of hydrogel can be spin-coated onto silicon substrate with UV exposure. The vinyl-functioned silicon substrates are modified with TMSPMA. The PDMS-grafted polyelectrolyte hydrogel are fabricated via in situ polymerization. The samples are washed with Milli-Q water and alcohol in order to remove the unreacted precursor.

Counterion exchange. The Cl⁻ in PMETAC monomer can be exchanged by immersing the hydrogel samples into 0.5 M salt solutions of target counter-anions for 30 min. The films are then washed with Milli-Q water in order to remove excess free salts on surface. The success of counterion exchange can be confirmed by measurements of x-ray photoelectron spectroscopy (XPS).

Surface characterization. The hydrogel film thicknesses can be calculated from the UV-Vis reflective spectrum. The static contact angles can be measured by a drop size analyzer. The structures of various PDMS-grafted polyelectrolyte hydrogels can be detected by Fourier Transform Infrared Spectroscopy (FTIR). The copolymerization and ion exchange can be detected by XPS measurements. The morphologies of different PDMS-grafted polyelectrolyte hydrogel surfaces before and after ice adhesion tests can be detected by AFM.

Ice nucleation measurement. The heterogeneous ice nucleation temperature ($T_H$) and ice nucleation delay time ($t_D$) on various PDMS-grafted polyelectrolyte hydrogel surfaces can be measured by an optical microscope which is coupled with a high speed camera. The resolution of the high speed camera is 0.1 ms (104 frames/s). The cooling processes can be regulated by a cryostage. The temperature resolution of $T_H$ is less than 0.1° C. The $T_H$ on anti-icing hydrogel surface is the temperature when the ice nucleus appears. The ice nucleus on nanoscale cannot be observed by the optical microscope. However, the freezing of the whole water droplet can be observed by detecting the change of opacity before and after droplet freezing. The freezing time for a whole water droplet is shorter than 1 s. When the cooling rate is 5° C./min, the temperature error between freezing temperature of whole droplet and $T_H$ is lower than 0.1° C. Therefore, the value of $T_H$ is almost the same with that of freezing temperature of the whole water droplet if the cooling rate is not so fast (the cooling rate is 2° C./min). The $t_D$ is the delay time when the multifunctional anti-icing hydrogel surfaces reach objective temperatures before freezing. All the data of the $T_H$ and $t_D$ are the statistical average of more than 200 freezing events for each hydrogel sample. The error bar is determined by the standard errors of the mean (SEM).

Ice propagation measurement. The ice propagation rate (time) of condensed water on various PDMS-grafted polyelectrolyte hydrogel can be measured by an optical microscope coupled with a high speed camera. The condensed water droplets formed on the hydrogel surface via 'evaporation and condensation processes' in a closed cell. The relative humidity in the sample cell is controlled at 100%. In order to exclude the influence of different $T_H$ of various hydrogel surfaces with different counterions, the ice propagation measurements can be performed at −15.0° C., and the initial ice propagations can be triggered by a frozen AgI droplet.

Ice adhesion measurement. The ice adhesion strength can be measured on a cooling stage coupled with a XY motion stage and a force transducer. Each data of ice adhesion strength on various PDMS-grafted polyelectrolyte hydrogel is averaged over 10 individual measurements. The nitrogen gas can be purged into the closed sample cell to minimize the effect of frost formation. The tests are performed at various temperatures when the water froze completely. A cylindrical water container is used to minimize the effect of stress concentration.

Ice formation time measurement. The ice formation time on PDMS-grafted polyelectrolyte hydrogel surface includes both ice nucleation and ice propagation time. The ice formation time can be measured via an optical microscope coupled with a high speed camera. The ice formation time on various substrates coated with PDMS-grafted polyelectrolyte hydrogel are measured at −25° C.

Multifunctional anti-icing hydrogel coated on various surfaces. Various surface including metals, ceramic, glass and polymers can be vinyl-functioned by the dopamine methacrylamide (DMA). Different substrates can be washed by isopropanol and deionized water, and then treated with oxygen plasma. The prepared substrates are dip-coated into an aqueous solution of DMA (2 mg/ml) for 12 hours. Then the substrates are washed with Milli-Q water and completely dried.

Example 1: Inhibition of Ice Nucleation

Many have tuned the inhibition of heterogeneous ice nucleation (HIN) before freezing via modifying material surface chemistry and morphology, since HIN can be the initial and controlling step of ice formation. (See, e.g., He, Z., et al., ACS Appl. Mater. Interfaces 9, 30092-30099 (2017); and Fitzner, M., et al., J. Am. Chem. Soc. 137, 13658-13669 (2015), the disclosures of which are incorporated herein by reference.) The delay of HIN can provide favorable conditions for the removal of impacting or condensed supercooled water droplets by using different methods. (See, e.g., Mishchenko, L., et al., ACS Nano 4, 7699-7707 (2010); and Graeber, G., et al., Proc. Natl. Acad. Sci. USA 114, 11040-11045 (2017), the disclosures of which are incorporated herein by reference.) Recently, it is found that the efficiency of different ions in tuning HIN can be correlated with the ion-specific effect on structural transformation from liquid-like to ice-like water. (See, e.g., Liu, Z., et al., RSC Adv. 7, 840-844 (2017), the disclosure of which is incorporated herein by reference.)

In many embodiments, the structure of interfacial water can be determined by the type and amount of counterions distributed at solid/water interface. The ice nucleation efficiency increases with the fraction of ice-like water molecules. Therefore, the heterogeneous ice nucleation temperature ($T_H$) is higher on the surface with counterions having greater capability of inducing ice-like water in accordance with several embodiments. The $T_H$ on anti-icing hydrogel surface is the temperature when the ice nucleus appears. The value of $T_H$ can be very close to that of freezing temperature of the whole water droplet if the cooling rate is not so fast. In some embodiments, the $T_H$ on these anti-icing hydrogels can be regulated over a large window by using different counterions in the gel network.

Figure 6A:
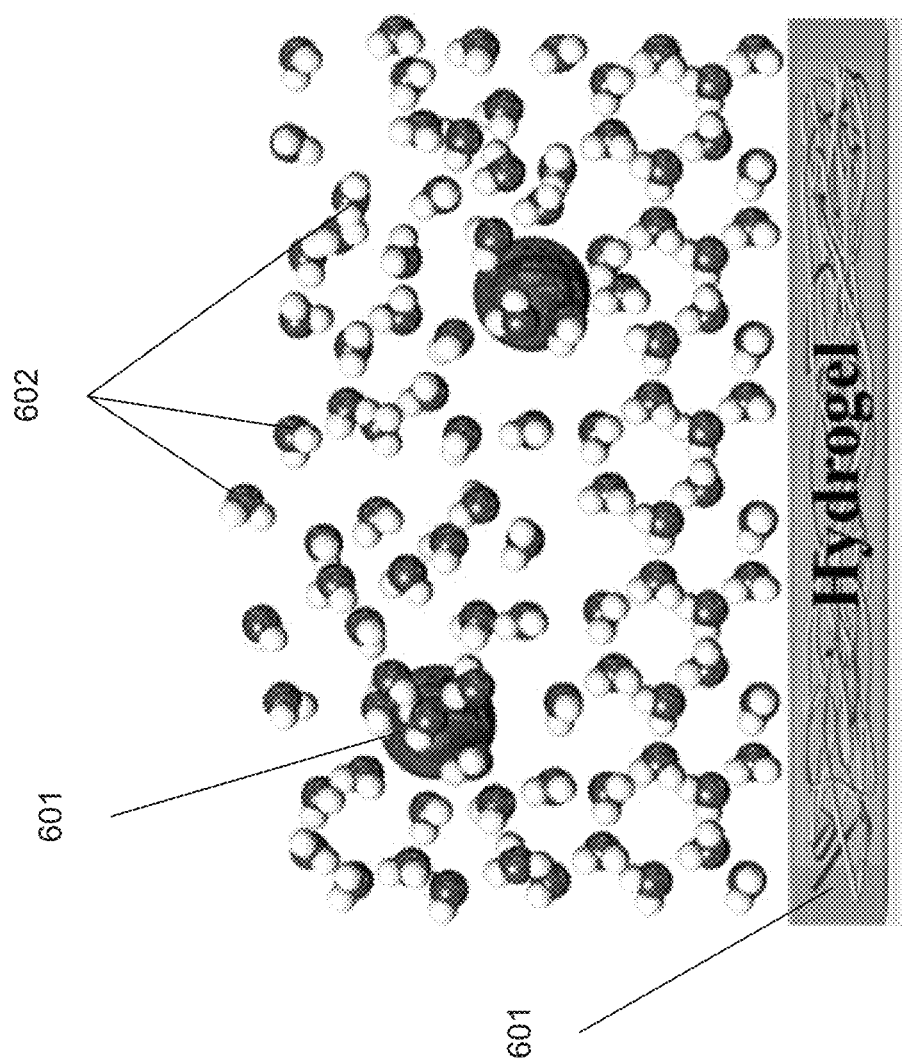
FIGS. 6a to 6f illustrate: a) an ice-like interfacial water on the anti-icing hydrogel with different counterions in accordance with an embodiment, b) polarized optical microscopic images of water droplet freezing at different temperatures on PG1 surfaces with counterion of iodide (I⁻) and perfluorooctanoate (PFO⁻), where the scale bar is 200 µm in accordance with an embodiment, c) a data graph of the influence of film thickness on the TH of PG1-I, PG1-SO₄, and PG1-PFO surfaces in accordance with embodiments, d) a data graph of the TH on various anti-icing hydrogels with counterions of I⁻, $SO_4^{2-}$, and PFO⁻ in accordance with an embodiment, e) a data graph of the TH on PG1 hydrogel with different counterions in accordance with an embodiment, f) a data graph of the freezing delay time ($t_D$) on PG1 hydrogel with counterions of I⁻, $SO_4^{2-}$, and PFO⁻ in accordance with an embodiment.

A schematic of an ice-like interfacial water on the anti-icing hydrogel with different counterions in accordance with an embodiment of the invention is illustrated in FIG. 6a. An anti-icing hydrogel (601) is in contact with an ice-like interfacial water layer. The interfacial water layer includes different counterions (601) and ice-like water molecules (602).

Figure 6B:
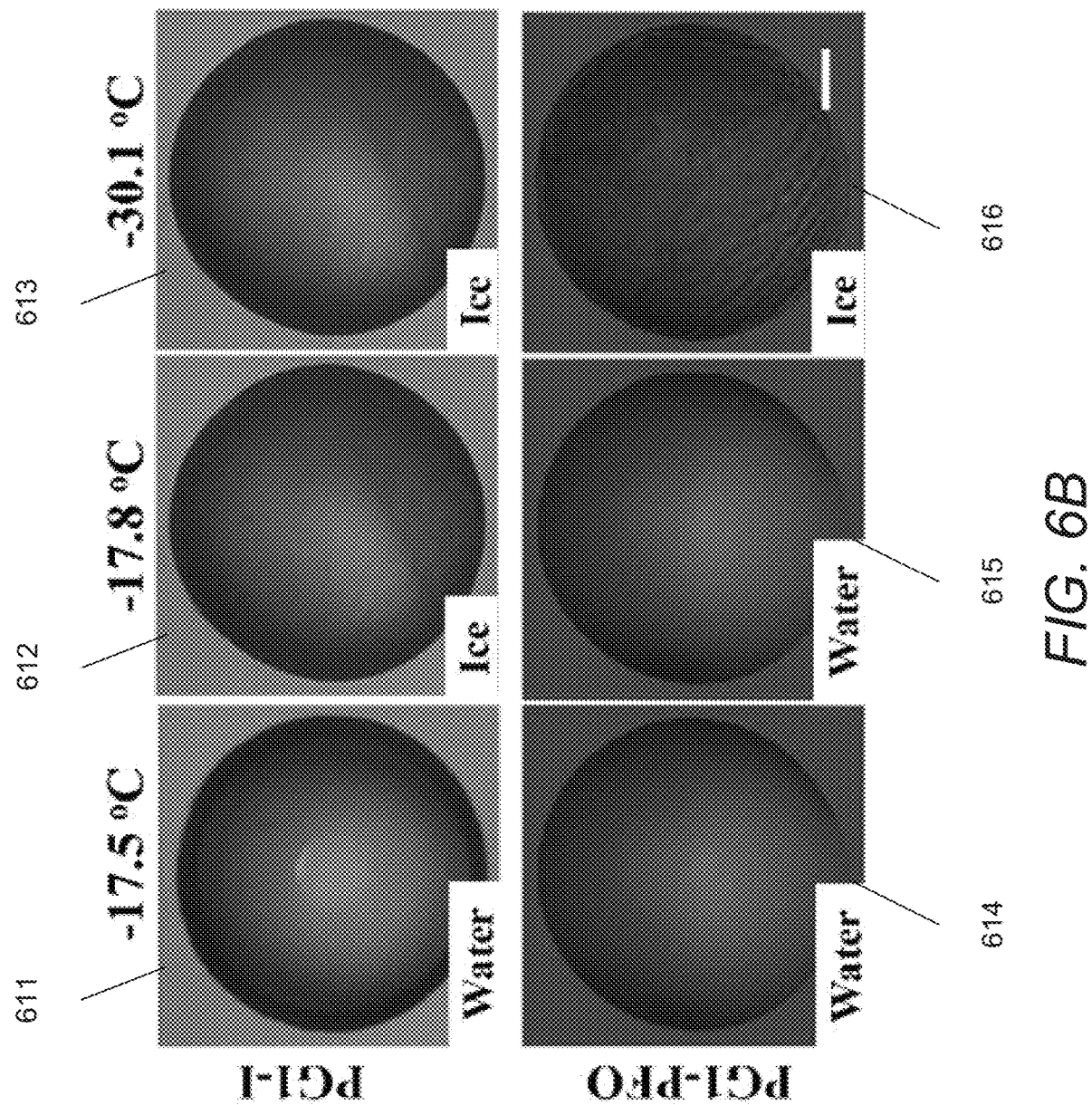

Many embodiments provide that the ice nucleation can be tuned by using different counterions in the gel network. In some embodiments, the $T_H$ on the PG1-I with counterion of iodide (I⁻) hydrogel surface is about −17.7° C., whereas it is about −29.9° C. on the same surface when the counterion is perfluorooctanoate (PFO⁻). The ice nucleation preferentially occurs on PG1-I hydrogel surface. The counterions of iodide can promote the formation of ice-like water molecules at hydrogel/water interface in accordance with some embodiments, thus enhancing the efficiency of ice nucleation. Polarized optical microscopic images of water droplet freezing at different temperatures on PG1 surfaces with counterion of iodide (I⁻) and perfluorooctanoate (PFO⁻) in accordance with an embodiment of the invention is illustrated in FIG. 6b. PG1 surface with counterion of I⁻ is water at −17.5° C. (611). The PG1 surface with I⁻ becomes ice at −17.8° C. (612). The PG1 surface with I⁻ is ice at −30.1° C. (613). In comparison, PG1 surface with counterion of PFO⁻ is water at −17.5° C. (614). PG1 surface with PFO⁻ is water at −17.8° C. (615). PG1 surface with PFO⁻ becomes ice at −30.1° C. (616). the scale bar is 200 μm. Different counterions can change ice nucleation temperature of the anti-icing hydrogel.

Figure 6C:
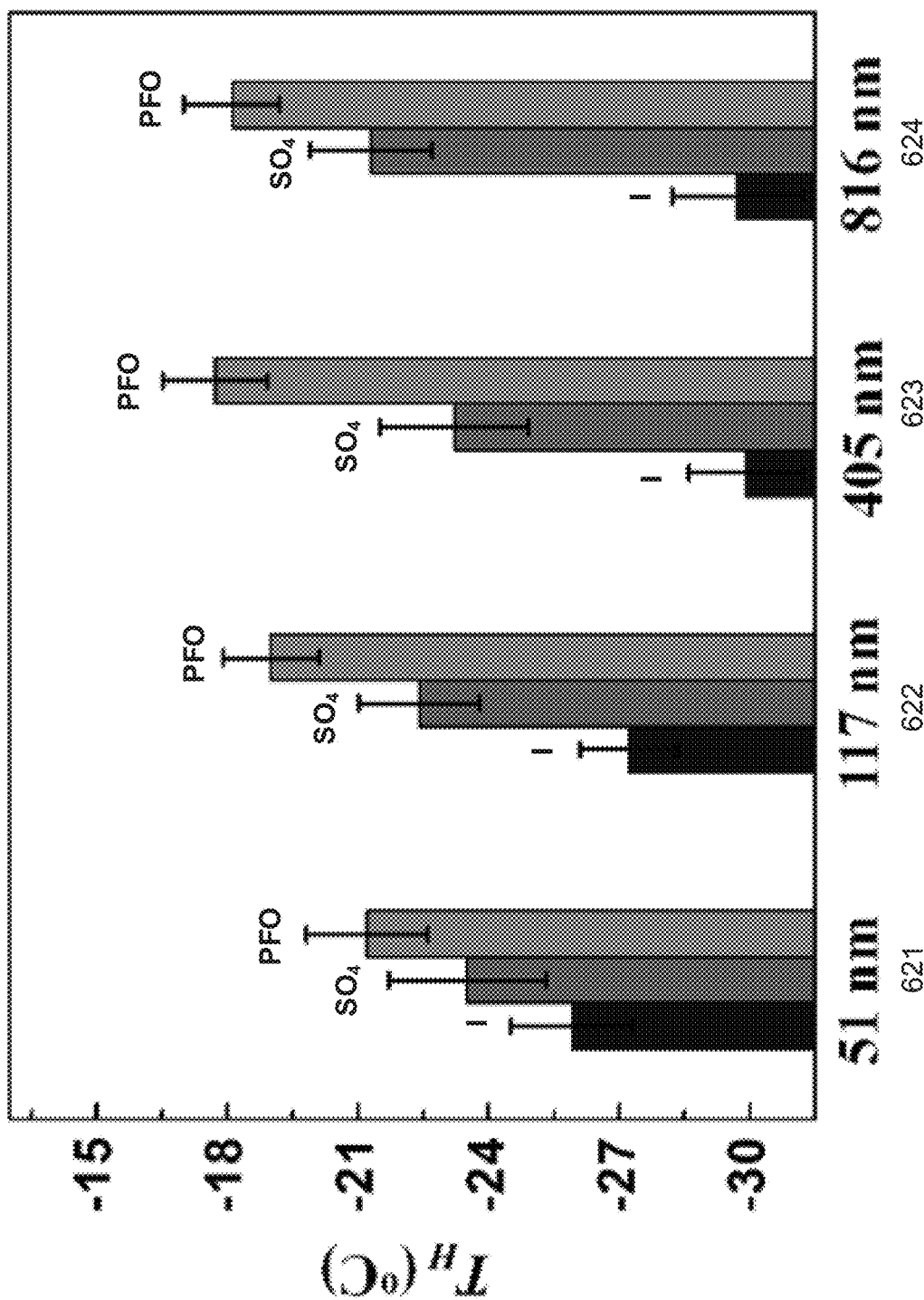

In several embodiments, the order of counterions in determining ice nucleation is independent of the film thickness. Many embodiments provide that the difference of $T_H$ can be amplified as the film thickness increases. The influence of film thickness on the $T_H$ of PG1-I, PG1-SO$_4$, and PG1-PFO surfaces in accordance with an embodiment of the invention is illustrated in FIG. 6c. PG1 hydrogel is mixed with different counterions: iodide (PG1-I), sulfate (PG1-SO$_4$), and PFO (PG1-PFO). With the film thickness of about 51 nm (621), PG1-I has the lowest $T_H$ than PG1-SO$_4$ and PG1-PFO, and PG1-PFO has the highest $T_H$. With the film thickness of about 117 nm (622), PG1-I has the lowest $T_H$ than PG1-SO$_4$ and PG1-PFO, and PG1-PFO has the highest $T_H$. With the film thickness of about 405 nm (623), PG1-I has the lowest $T_H$ than PG1-SO$_4$ and PG1-PFO, and PG1-PFO has the highest $T_H$. With the film thickness of about 816 nm (624), PG1-I has the lowest $T_H$ than PG1-SO$_4$ and PG1-PFO, and PG1-PFO has the highest $T_H$. $T_H$ of PG1-I becomes lower from about −26° C. to about −30° C., when the film thickness grows thicker from 51 nm to 816 nm. $T_H$ of PG1-SO$_4$ ranges between about −21° C. to about −24° C. when the film thickness ranges from 51 nm to 816 nm. $T_H$ of PG1-PFO becomes higher from about −21° C. to about −18° C., when the film thickness grows thicker from 51 nm to 816 nm.

Figure 6D:
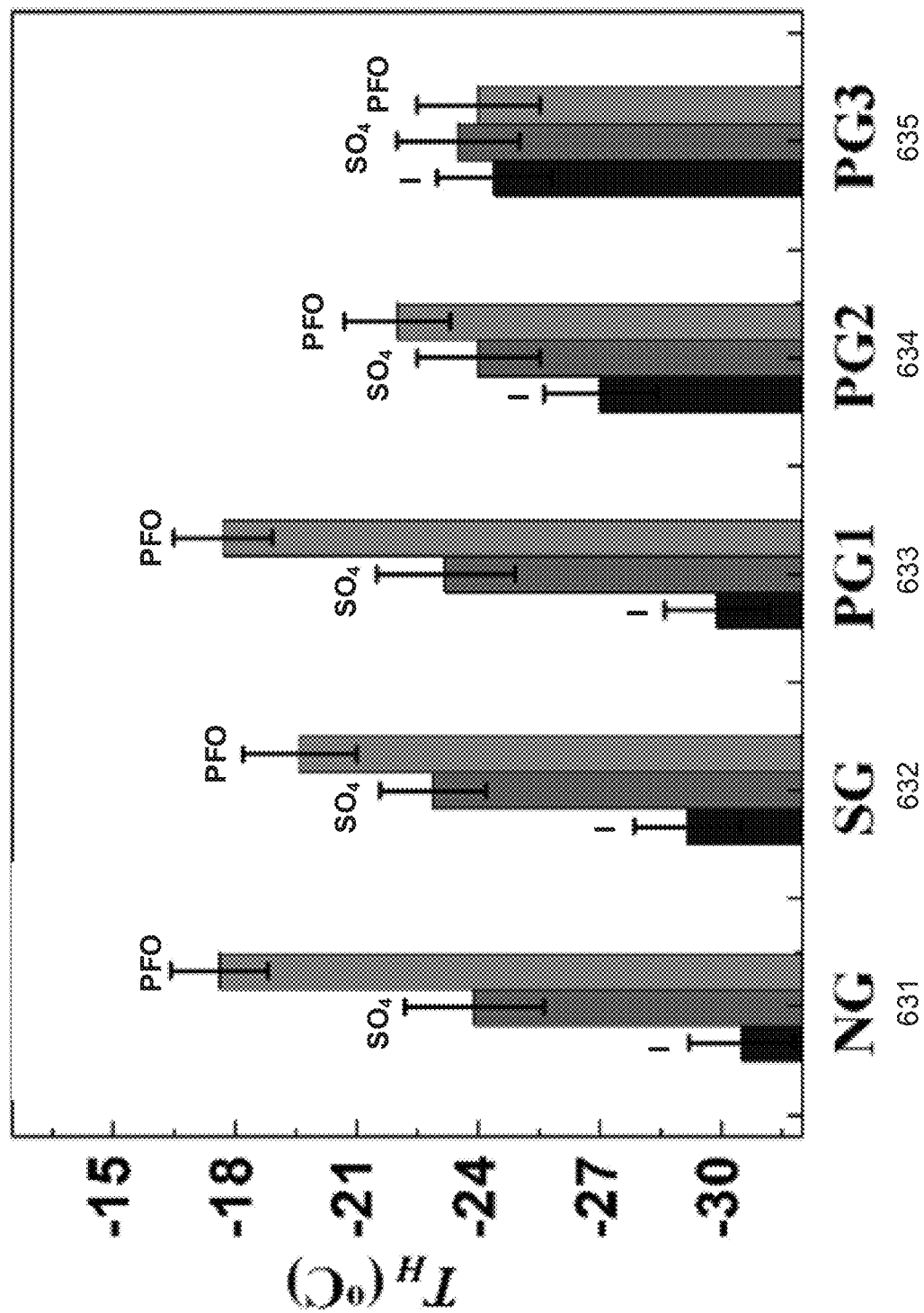

Many embodiments provide that the ion-specific effect in tuning $T_H$ decreases gradually along with the incorporation of long-chain PDMS macromonomers. Some embodiments provide that the ion-specificity may disappear on PG3 hydrogel surface. The $T_H$ on anti-icing hydrogels with various PDMS chain lengths and counterions of I⁻, SO$_4^{2-}$, and PFO⁻ in accordance with an embodiment of the invention is illustrated in FIG. 6d. The poly(AAm-co-AAc-co-AAene) hydrogels are cross-linked by different PDMS chain lengths: NG [poly[2-(Methacryloyloxy)ethyl]trimethylammonium (PMETA)] (631), SG (PMETA-co-PDMS) (632), PG1 [(PMETA)-g-(PDMS-0.9K)] (633), PG2 [(PMETA)-g-(PDMS-5.7K)] (634) and PG3 [(PMETA)-g-(PDMS-13.2K)] (635). With the same PDMS chains, counterion I shows lower $T_H$ than SO$_4$, and SO$_4$ shows lower $T_H$ than PFO. The longer the PDMS chain, the higher $T_H$ of the hydrogel with I counterions. The PDMS chain lengths do not affect $T_H$ of the hydrogel with SO$_4$ counterions. The longer the PDMS chain lengths, the lower $T_H$ of the hydrogel with PFO counterions. The longer the PDMS chain lengths, the less tuning effect of the counterions have on $T_H$ of the hydrogel.

Figure 6E:
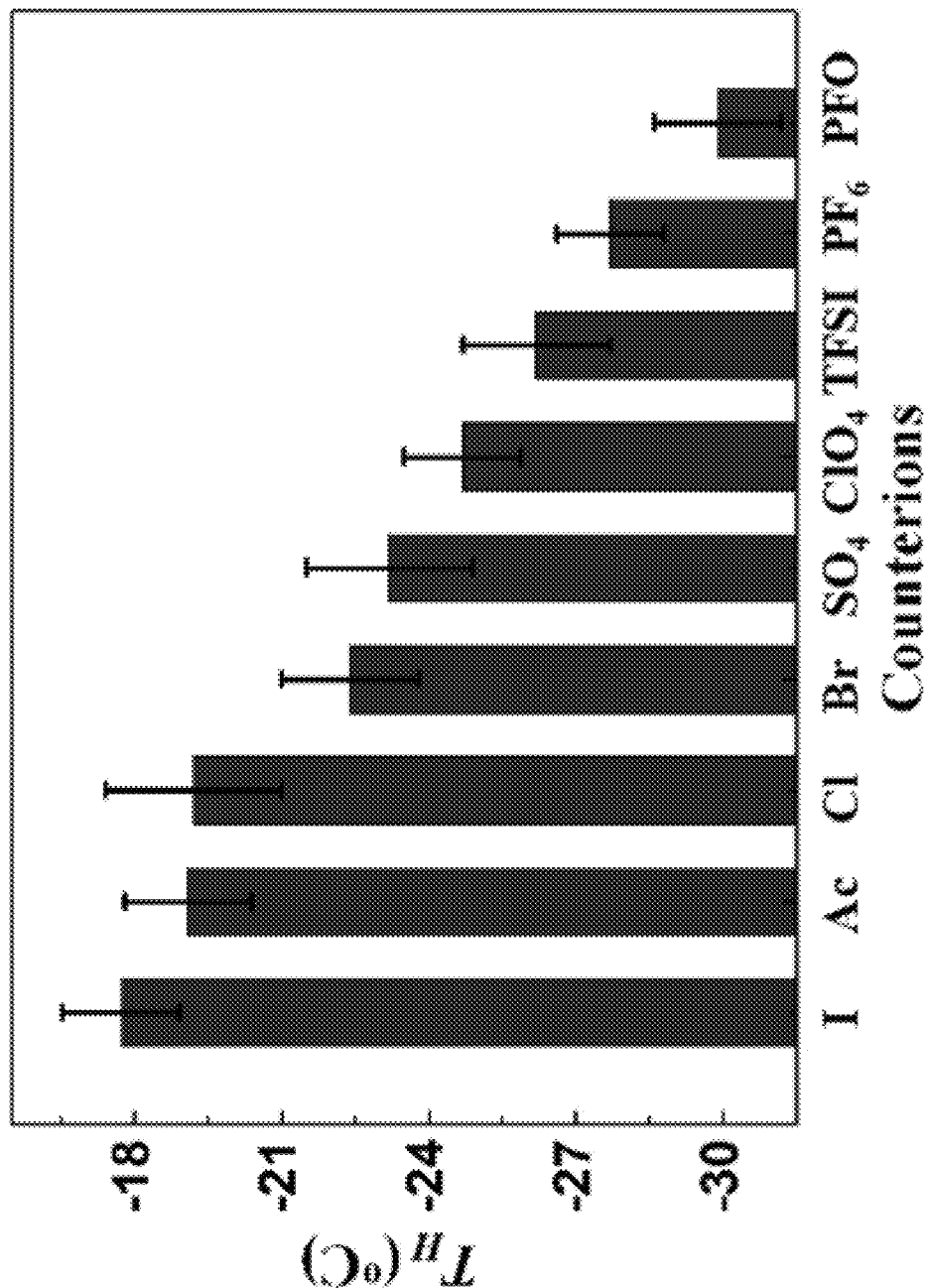

Several embodiments provide the $T_H$ tuning window of anti-icing hydrogel can be up to 12° C. Some embodiments show the series of counterions in tuning $T_H$ on PG1 hydrogel surface with a tunable $T_H$ window of about 12° C. The $T_H$ on PG1 hydrogel with different counterions in accordance with an embodiment of the invention is illustrated in FIG. 6e. PG1 hydrogel with I counterion shows the broadest tuning window of $T_H$. A series of PG1 hydrogel counterions from the broadest tuning widow of $T_H$ to the narrowest is: I>Ac>Cl>Br>$SO_4$>$ClO_4$>TFSI>$PF_6$>PFO.

Figure 6F:
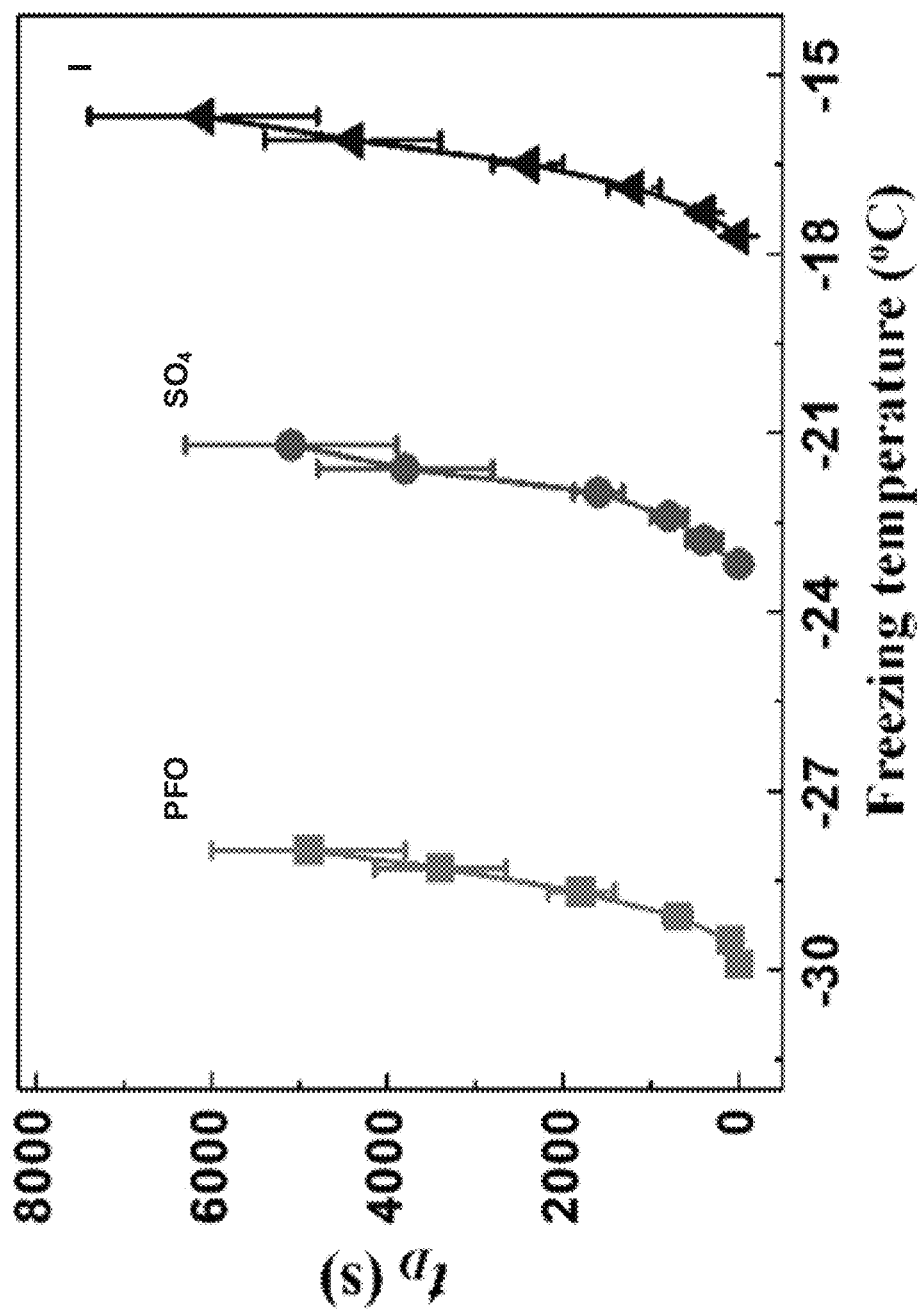

Many embodiments provide that the heterogeneous ice nucleation delay time ($t_D$) on the PG1 hydrogel surface consolidates the efficiency of different counterions in tuning $T_H$. The freezing delay time ($t_D$) on PG1 hydrogel with counterions of $I^-$, $SO_4^{2-}$, and $PFO^-$ in accordance with an embodiment of the invention is illustrated in FIG. 6f. $t_D$ on the PG1 hydrogel surface with counterions of I, $SO_4$, and PFO shows similar trends as the counterions effects on tuning $T_H$.

Figure 7:
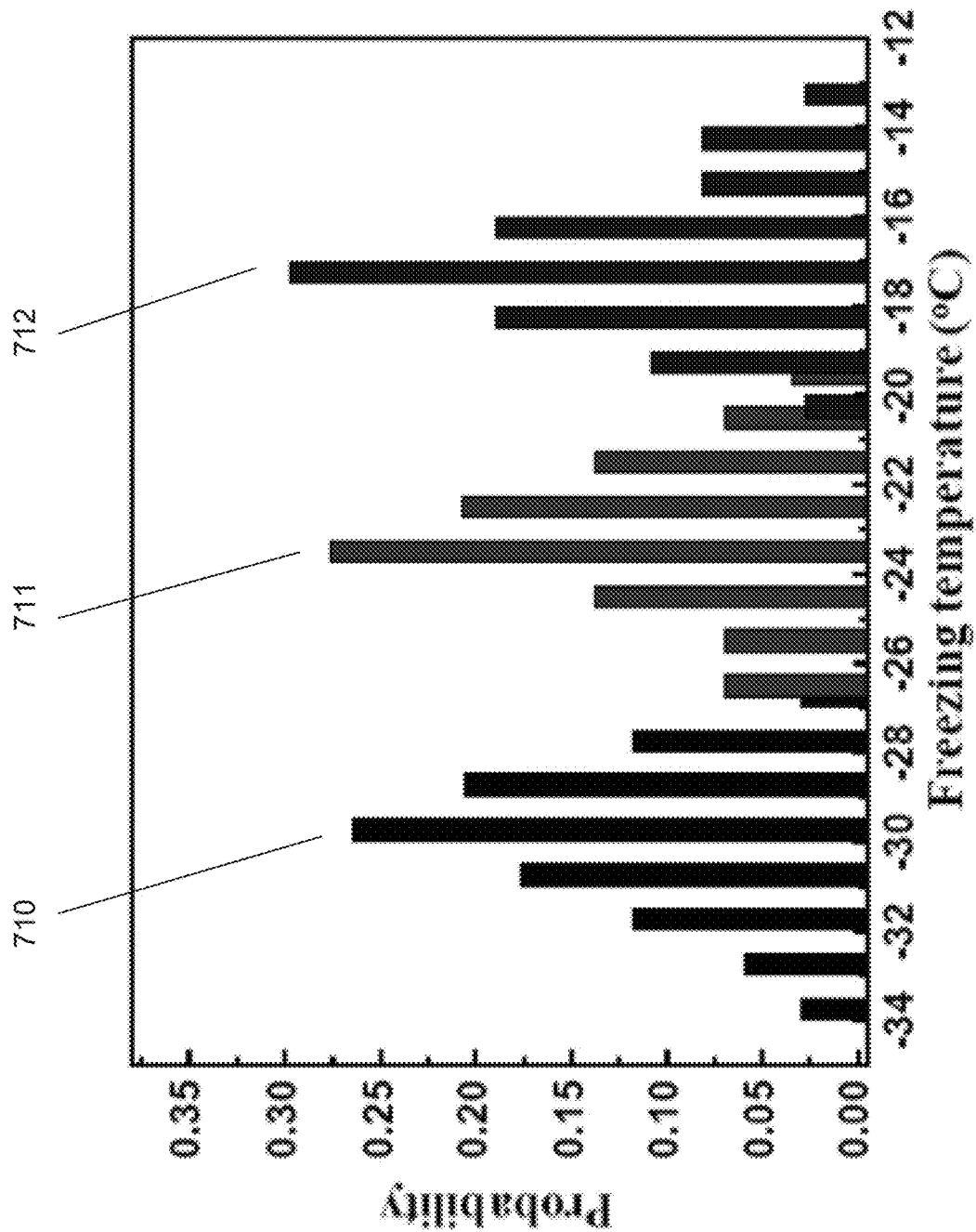
FIG. 7 illustrates a data graph of the freezing temperature distribution of PG1 with different counterions in accordance with an embodiment.

Some embodiments show that counterion I can promote the formation of ice-like water molecules at hydrogel/water interface and enhance the efficiency of ice nucleation. The freezing temperature distribution of PG1 with different counterions in accordance with an embodiment of the invention is illustrated in FIG. 7. PG1 with PFO counterions (710) shows a high freezing temperature at around −27° C. PG1 with $SO_4$ counterions (711) shows a medium freezing temperature at around −23.5° C. PG1 with I counterions (712) shows a low freezing temperature at around −17° C.

Figure 8:
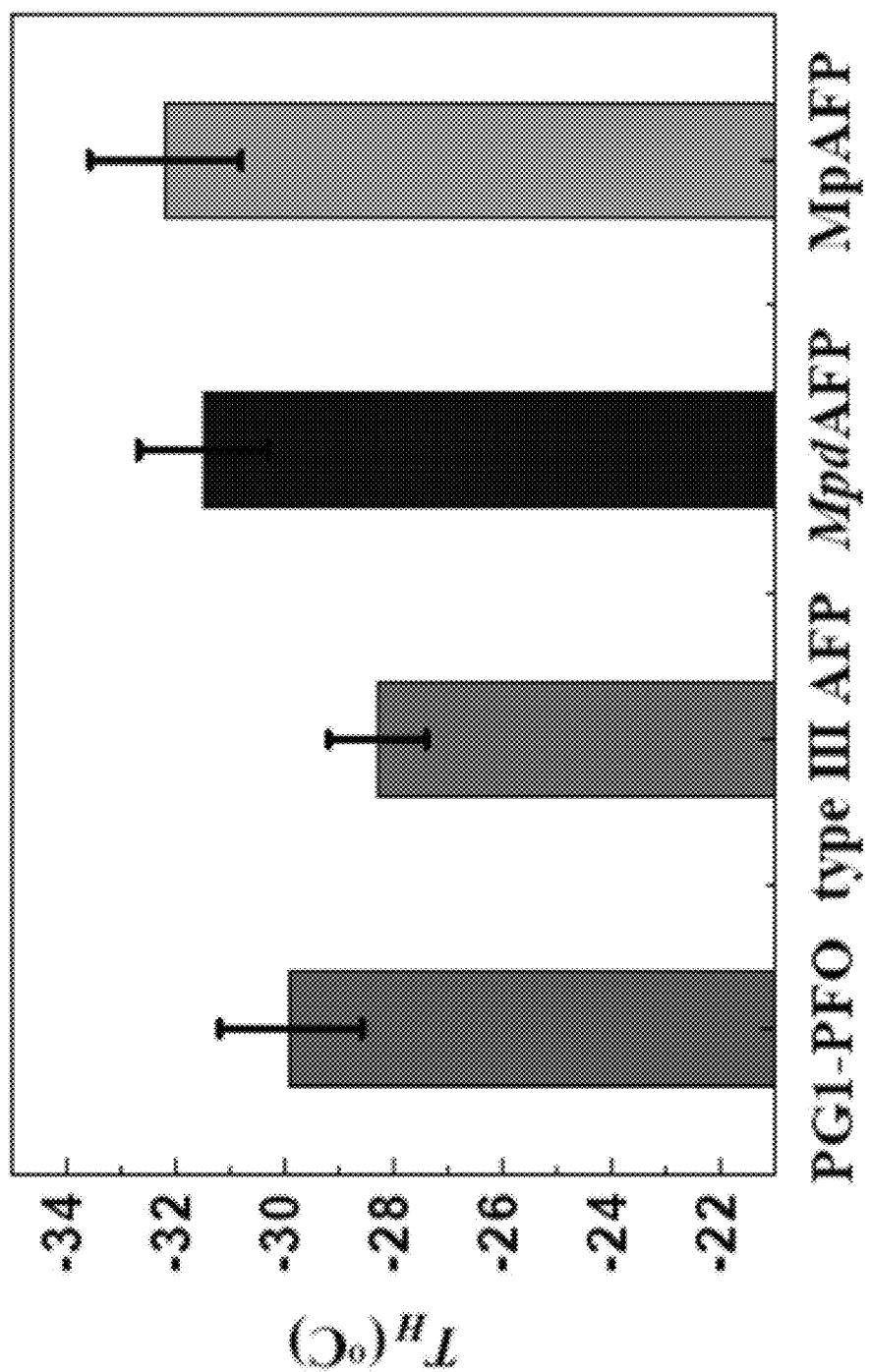
FIG. 8 illustrates a comparison of $T_H$ of PG1-PFO with different antifreeze proteins (AFPs) in accordance with an embodiment.

Many embodiments provide that the inhibition of ice nucleation efficiency of PG1-PFO surfaces is comparable to the AFPs. The $t_D$ of most anti-icing surfaces was measured in the freezing temperature range of −10 to −20° C. (See, e.g., Wang, L., et al., Adv. Mater. 28, 7729-7735 (2016); Alizadeh, A., et al., Langmuir 28, 3180-3186 (2012); and Guo, P., et al., Adv. Mater. 24, 2642-2648 (2012), the disclosures of which are incorporated herein by reference.) Many embodiments provide the freezing delays of PG1-PFO hydrogel surface at ultra-low temperatures. Several embodiments show that the PG1-PFO hydrogel surface can remain unfrozen for more than 4800 s at about −28° C., exhibiting high performance of inhibiting ice nucleation. A comparison of $T_H$ of PG1-PFO with different antifreeze proteins (AFPs) in accordance with an embodiment of the invention is illustrated in FIG. 8. The $T_H$ of PG1-PFO is comparable with type III AFP, Mpd AFP, and MpAFP.

Example 2: Ice Propagation

In real-world environments, sometimes the undesired HIN is inevitable due to the contaminants, dusts, surface edges and defects, giving rise to ice propagation across the entire surface. (See, e.g., Jin, Y., et al., Angew. Chem. Int. Edit. 56, 11436-11439 (2017); and Chen, X., et al., Sci. Rep. 3, 2515 (2013), the disclosures of which are incorporated herein by reference.) In addition to ice nucleation, the subsequent ice propagation can play an important role in ice formation on foreign surfaces. The ice propagation rate, which is the change of ice cover area per unit time during ice propagation process, can be used to quantify the ice propagation inhibition efficiency of various coatings. Some embodiments provide that ice propagation on a hydrated surface can be determined by the amount of interfacial water. In several embodiments, more interfacial water can result in higher ice propagation rate. The amount of interfacial water can be controlled by tuning the hydrophobicity (via tuning PDMS chain length) to balance the counterions in accordance with several embodiments. A schematic of ice propagation on the anti-icing hydrogel surface in accordance with an embodiment of the invention is illustrated in FIG. 9a. Ice (902) propagation from water (902) can be seen on the hydrogel (903) surface.

In some embodiments, ion-specificity can have effect on tuning interfacial water amount, such as, the counterion-driven 'hydrophobic collapse'. Several embodiments provide the ice propagation rates on various hydrogel surfaces with different counterions. When the PG1 hydrogel undergoes a transition from hydrophilic to hydrophobic state by exchanging $I^-$ with $PFO^-$, the propagation time (the area is $3.3\times10^5$ μm$^2$) increases from 30 to 1680 ms in accordance with certain embodiments. Time-resolved optical microscopic images of ice propagation on PG1-I and PG1-PFO hydrogel surfaces in accordance with an embodiment of the invention are illustrated in FIGS. 9b-c. In FIG. 9b, ice propagation on PG1-I hydrogel surface is shown. 'I' is ice and 'W' is water. The scale bar is 100 μm. In FIG. 9c, ice propagation on PG1-PFO hydrogel surface is shown.

Figure 9D:
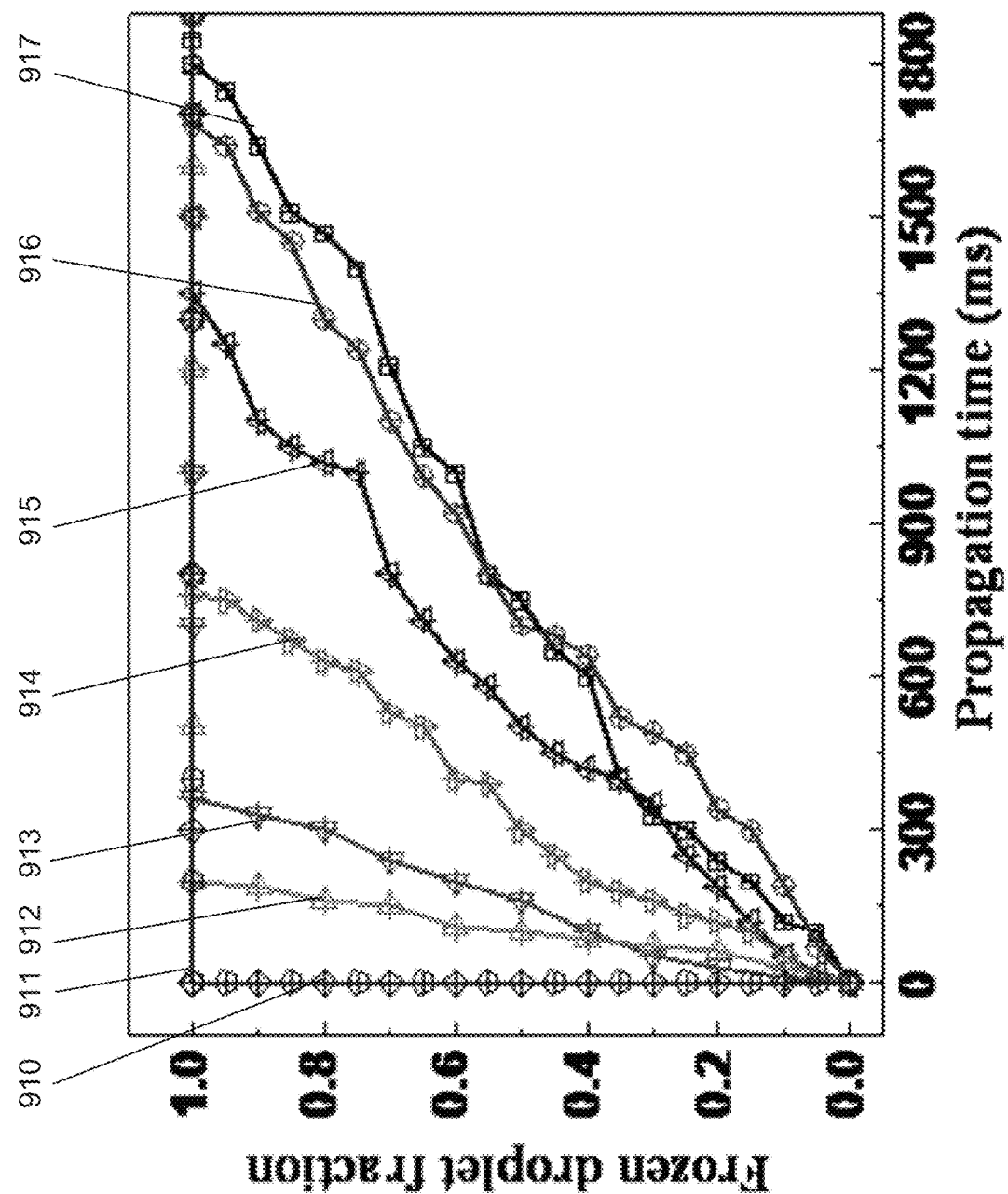

Many embodiments provide that the ice propagation time (the area is about $3.3\times10^5$ μm$^2$) on PG1 surface can be tuned by up to two orders of magnitude via changing different counterions. The change of fraction of frozen droplets on various anti-icing hydrogel surfaces with different counterions vs ice propagation time in accordance with an embodiment of the invention is illustrated in FIG. 9d. SG-PFO (910) and PG1-I (911) are almost overlapping and show the shortest propagation time. PG3-PFO (912), PG2-I (913), PG1-$PF_6$ (914), PG2-$PF_6$ (915), PG1-PFO (916), and PG2-PFO (917) are also shown respectively. PG2-PFO (917) shows the longest propagation time.

Figure 9E:
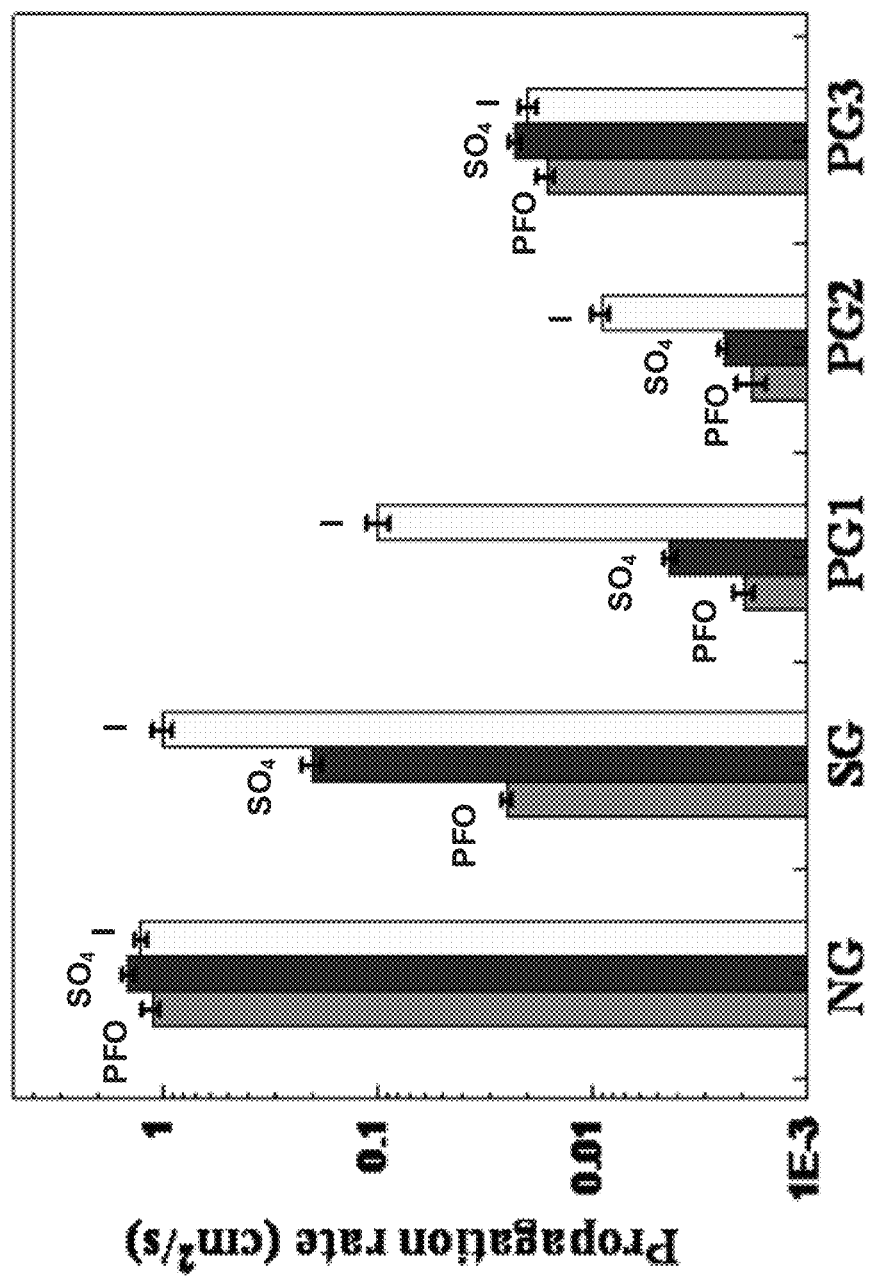

To exclude the influence of different $T_H$ of various hydrogel surfaces, the ice propagation measurements are performed at −15.0° C. in accordance with several embodiments. In some embodiments, when the PDMS chains are too long (PG3), the water molecules cannot penetrate into the hydrogel which will not be tuned by ions. In such embodiments, the surfaces can no longer inhibit the ice propagation effectively which is similar with the conventional pure PDMS surfaces. The ice propagation rate on various anti-icing hydrogels with counterions of $I^-$, $SO_4^{2-}$, and $PFO^-$ in accordance with an embodiment of the invention is illustrated in FIG. 9e. In contrast to the PGs with longer-chain PDMS (PG1 and PG2), the amounts of interfacial water in NG and SG are overly high, even with the presence of the highly hydrophobic counterion of $PFO^-$. This indicates that the hydrophobicity, which can be tuned by PDMS chain lengths in accordance with certain embodiments, plays a crucial role in modulating the amounts of interfacial water. As a result, the ultra-high ice propagation rate caused by excess amount of interfacial water keeps the NG and SG hydrogels from becoming multifunctional anti-icing materials. Many embodiments show that synergetic cooperation of hydrophobicity and ion-specificity can lead to an effective control of ice propagation.

Example 3: Ice Adhesion

Figure 10A:
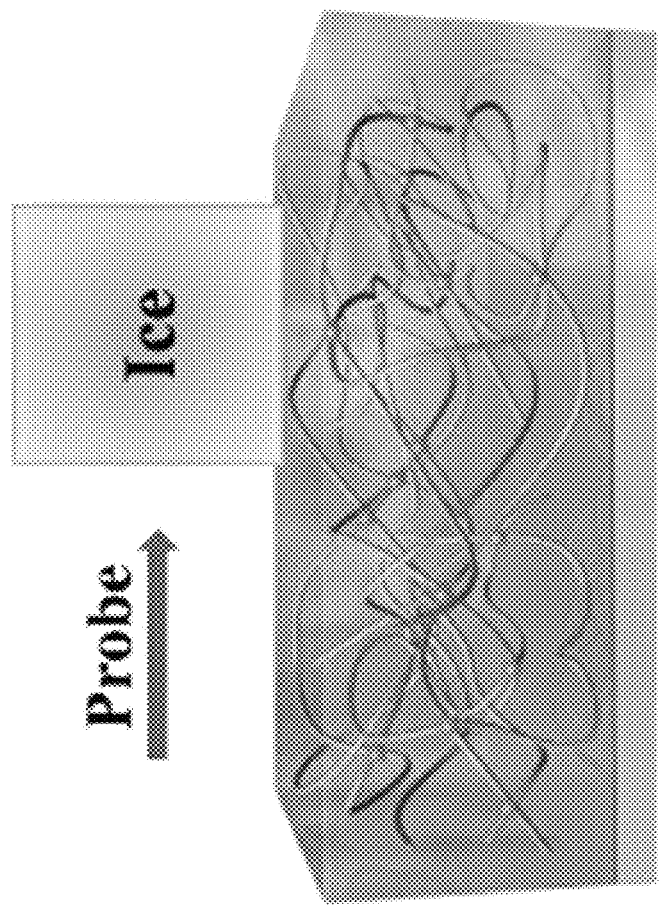
FIGS. 10a to 10f illustrate: a) detecting ice adhesion strength ($\tau_{ice}$) in accordance with an embodiment, b) a data graph of $\tau_{ice}$ on various anti-icing hydrogels with different counterions in accordance with an embodiment, c) a data graph of $\tau_{ice}$ on various anti-icing hydrogels (the counterion is PFO⁻) with different thicknesses in accordance with an embodiment, d) a data graph of $\tau_{ice}$ for various surfaces in 3 repeated icing/de-icing tests in accordance with an embodiment, e) a data graph of $\tau_{ice}$ on PG1-PFO surface after 50 icing/de-icing cycles in accordance with an embodiment, and f) a data graph of $\tau_{ice}$ on PG1-PFO surface at different temperatures in accordance with an embodiment.

Many embodiments show that anti-icing hydrogels can reduce ice adhesion. In some embodiments, the interfacial water can serve as an aqueous lubricating layer to reduce the ice adhesion strength. A schematic of detecting ice adhesion strength ($\tau_{ice}$) in accordance with an embodiment of the invention is illustrated in FIG. 10a.

Figure 10B:
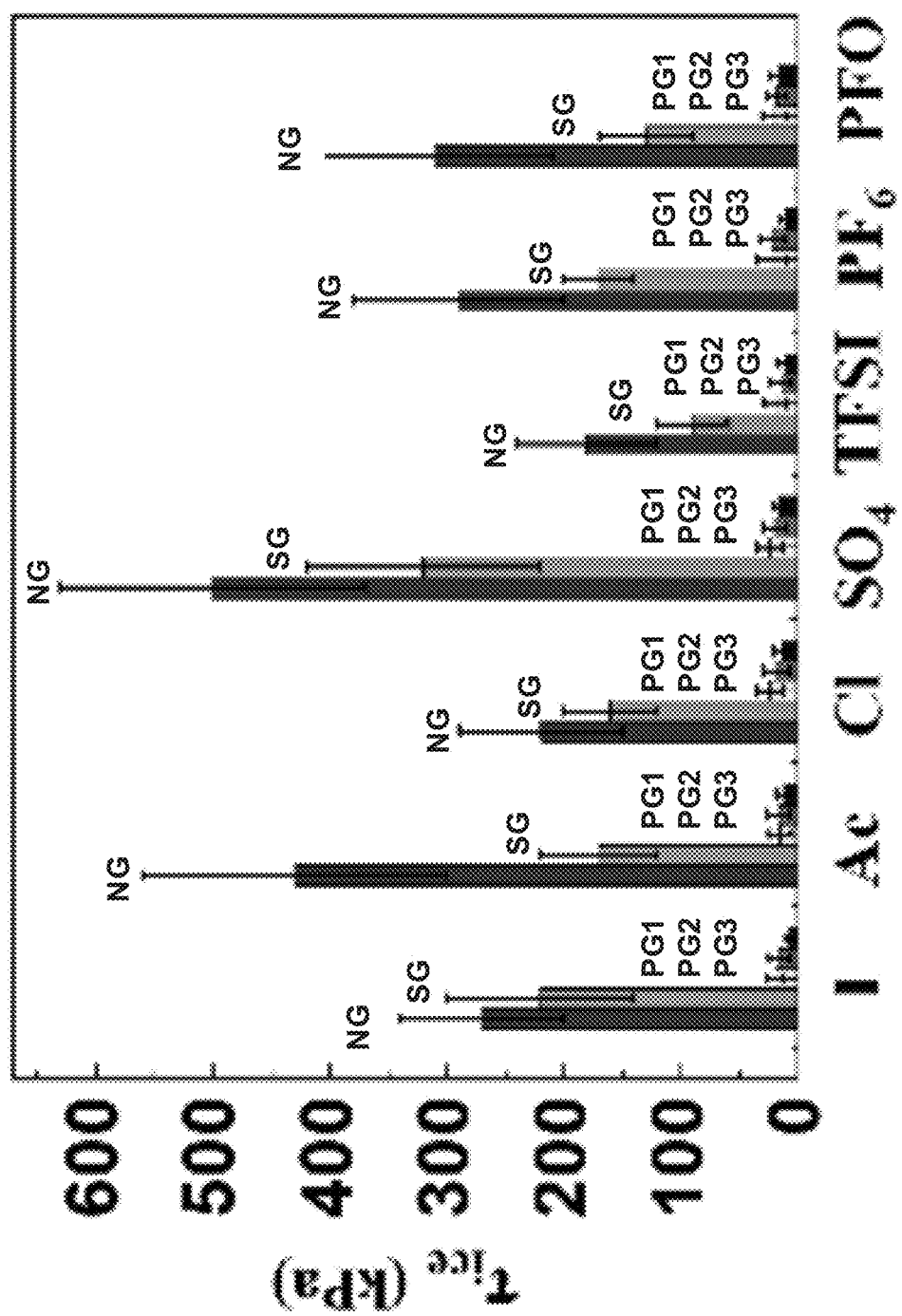

For unmodified hydrogel, the frozen water molecules can make ice form through the inside and outside of hydrogel in accordance with several embodiments, leading high ice adhesion strength. In some embodiments, the value of ice adhesion strength, $\tau_{ice}$, is higher than 200 kPa. In a number of embodiments, the introduction of grafted-PDMS chains can help retain the unfrozen interfacial water as a lubricating layer. In comparison with NG, the ice adhesion strengths of PG1-3 hydrogels, in according with certain embodiments, are lower by more than one order of magnitude. A graph of $\tau_{ice}$ on various anti-icing hydrogels with different counterions in accordance with an embodiment of the invention is illustrated in FIG. 10b. Hydrogels NG, SG, PG1, PG2, and PG3 with counterions I, Ac, Cl, $SO_4$, TFSI, $PF_6$, and PFO are shown. When compared to NG, the ice adhesion strengths of PG1-3 hydrogels, which has longer PDMS chains, are lower by more than one order of magnitude.

Figure 10C:
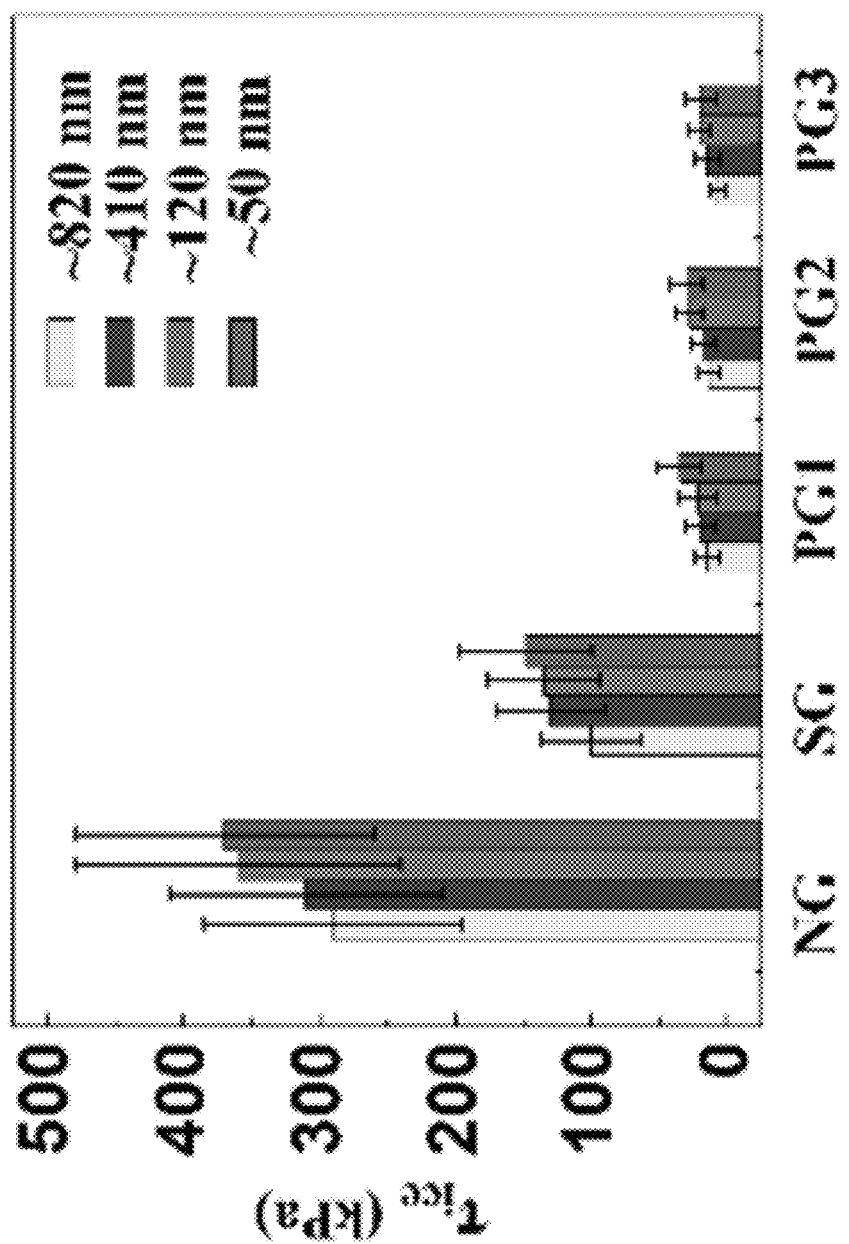

Several embodiments provide that the ice adhesion strength decreases as hydrogel film thickness increases, due to the increased thickness of viscous lubricating layer. $\tau_{ice}$ on various anti-icing hydrogels (the counterion is PFO—) with different thicknesses in accordance with an embodiment of the invention is illustrated in FIG. 10c. NG has the highest ice adhesion strengths while the ice adhesion strengths of PG1-3 hydrogels with longer PDMS chains are lower by more than one order of magnitude. The ice adhesion strength of NG, SG, PG1, PG2, and PG3 hydrogels decrease as the film thickness increase from about 50 nm to about 820 nm.

Figure 10D:
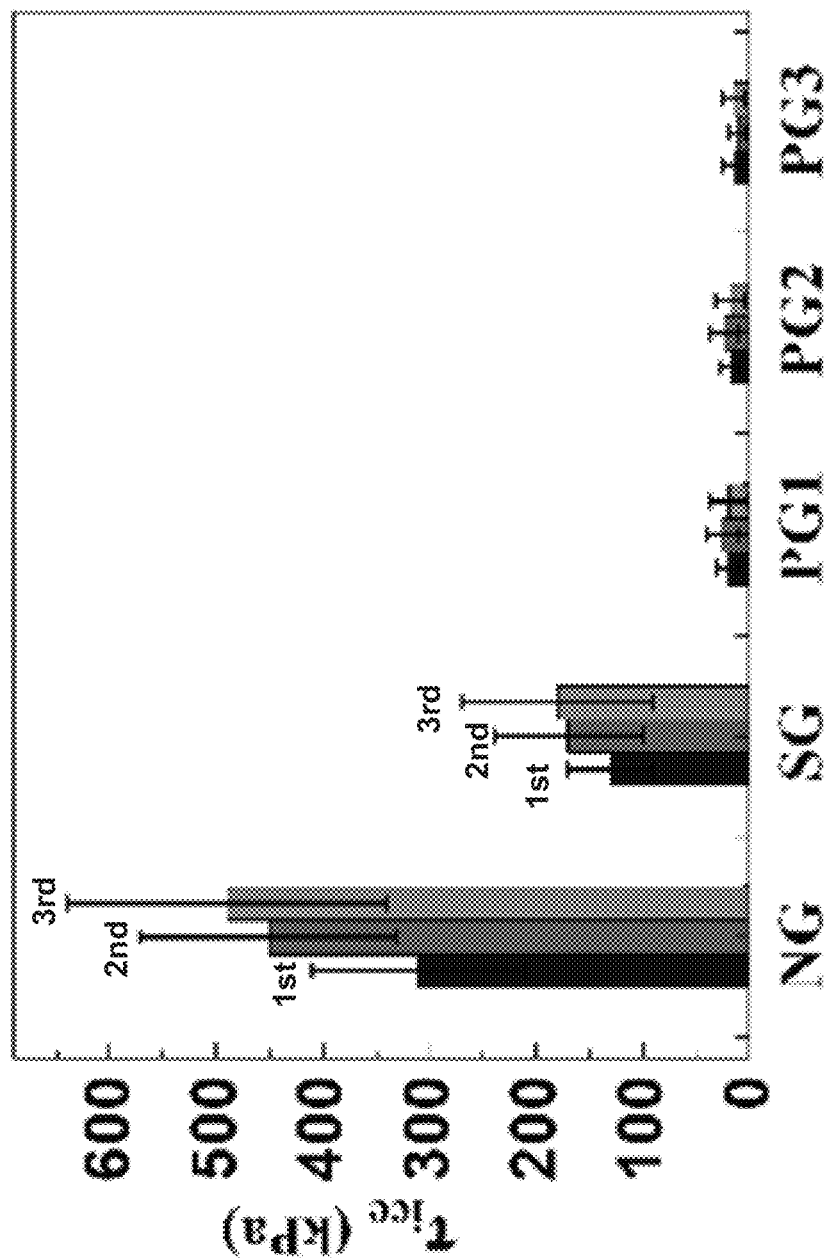

In several embodiments, the unmodified hydrogel of NG can be prone to damage when subjected to deicing test. In some embodiments, the ice adhesion strength increases significantly in 3 repeated icing/deicing tests. $\tau_{ice}$ for various hydrogel surfaces in 3 repeated icing/de-icing tests in accordance with an embodiment of the invention is illustrated in FIG. 10d. For NG, the ice adhesion strength increases significantly in 3 repeated icing/de-icing tests. For PG1, PG2 and PG3, there is not much change in ice adhesion strength in 3 repeated icing/de-icing tests.

Figure 10E:
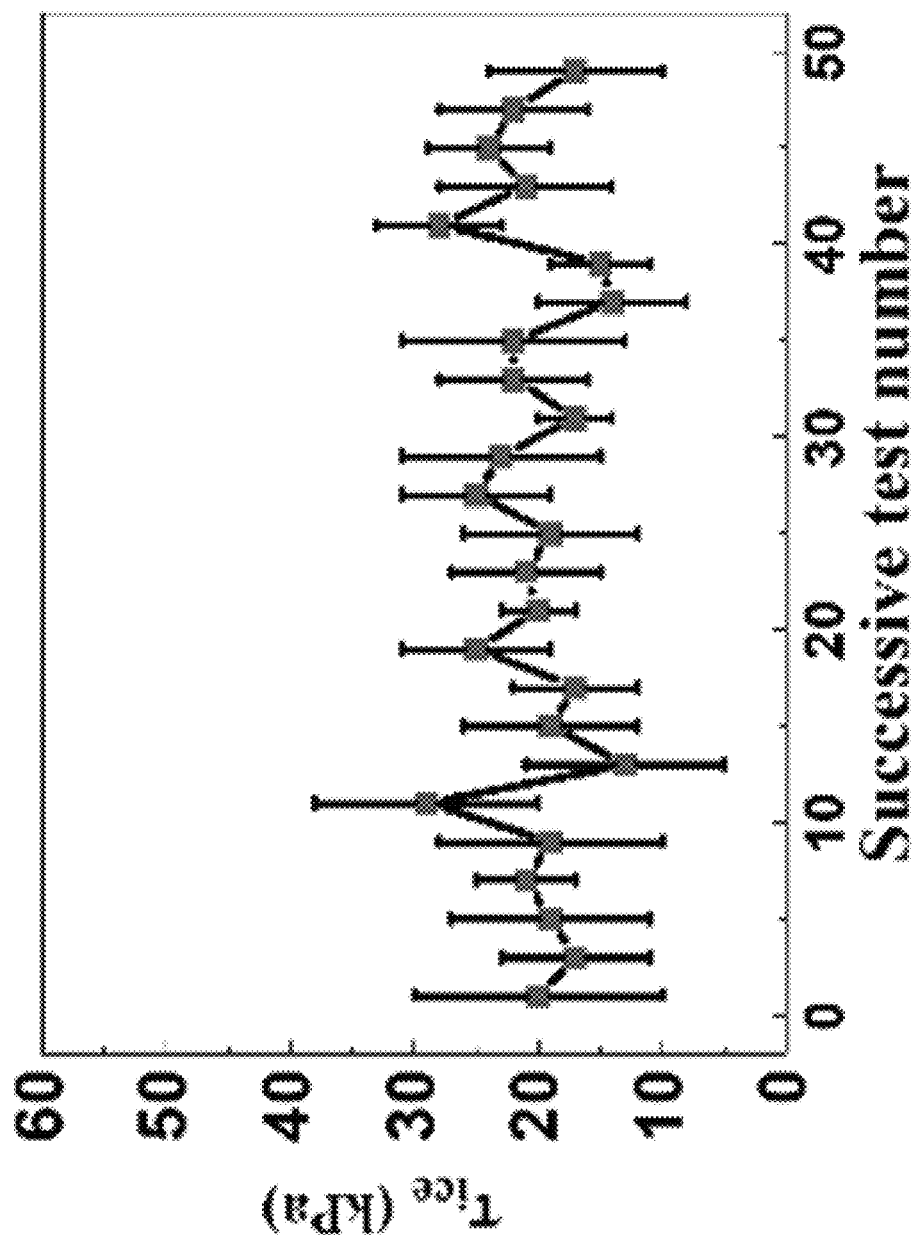

In many embodiments, PDMS-modified hydrogel including PG1-PFO, PG2-PFO and PG3-PFO coatings exhibit much higher mechanical robustness and long-term durability. $\tau_{ice}$ on PG1-PFO surface after 50 icing/de-icing cycles in accordance with an embodiment is illustrated in FIG. 10e.

Figure 10F:
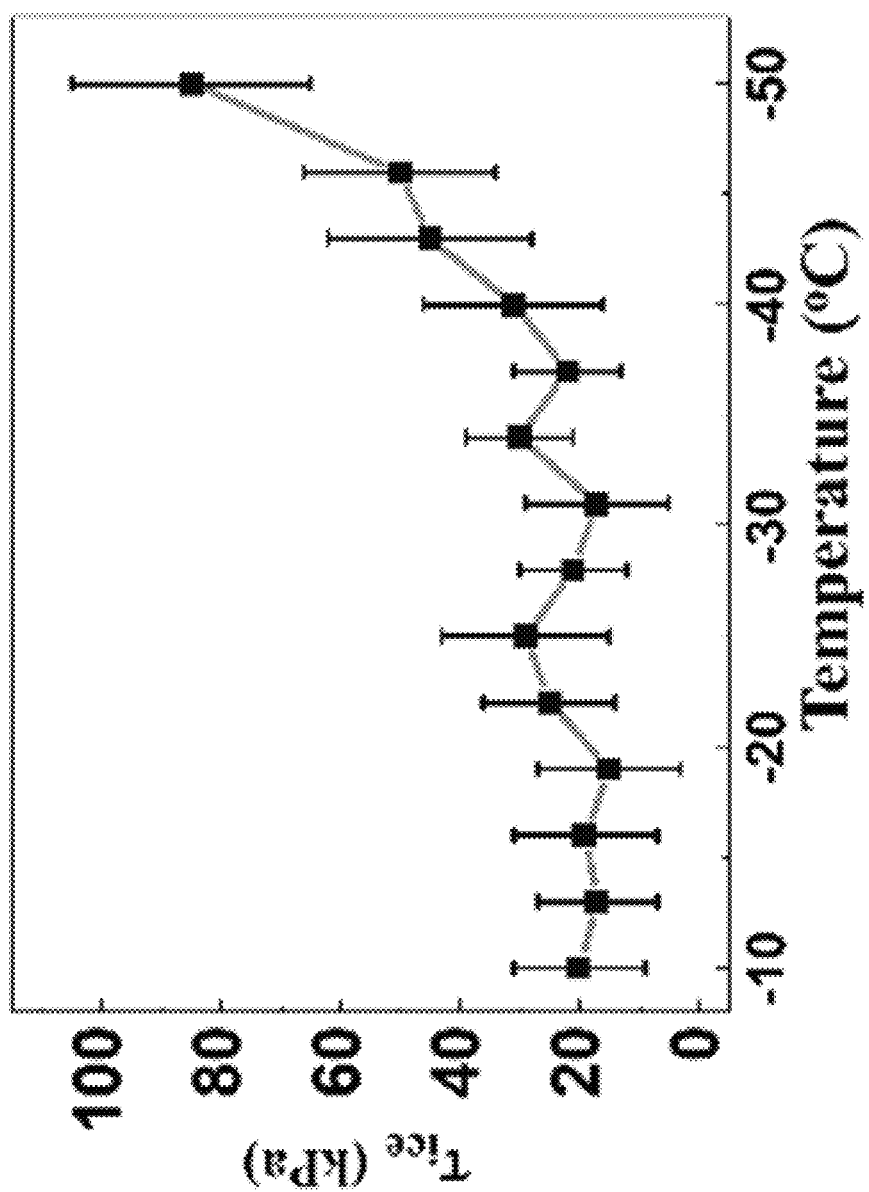

As the temperature is lower than −40° C., the gradually freezing of lubricating water layer at PG1-PFO hydrogel interface causes the increase of ice adhesion strength in accordance with some embodiments. $\tau_{ice}$ on PG1-PFO surface at different temperatures in accordance with an embodiment of the invention is illustrated in FIG. 10f.

Figure 11A:
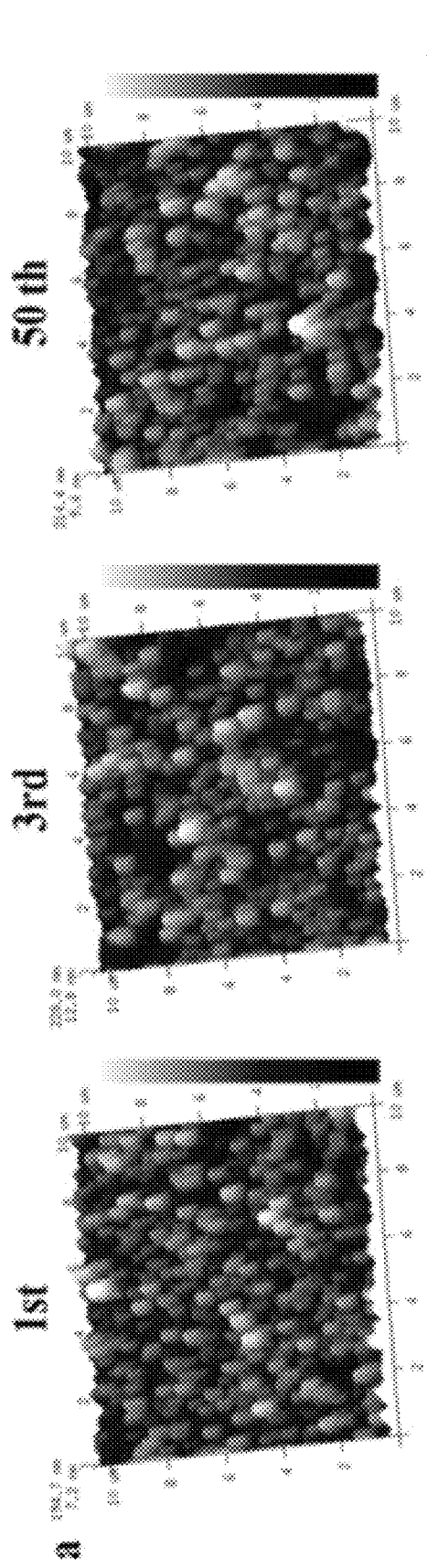
FIGS. 11a and 11b illustrate the AFM morphologies of: a) unmodified hydrogel and b) PDMS-modified PG1-PFO hydrogel after different repeated icing/deicing tests in accordance with an embodiment.
Figure 11B:
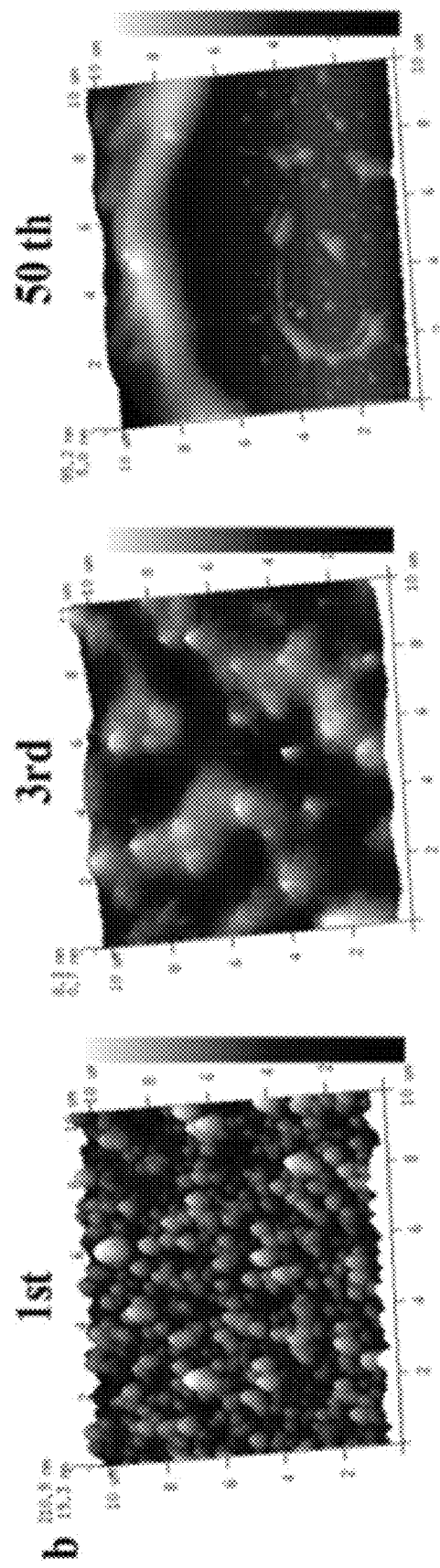

The ice adhesion strength on PG1-PFO hydrogel maintains at low value even after 50 icing-deicing cycles. The PDMS-modified hydrogel of PG1-PFO, in accordance with several embodiments, is soft matter, and the surface scratches can be observed through mechanical abrasion tests. AFM morphologies of unmodified hydrogel and PDMS modified PG1-PFO after different repeated icing/deicing tests in accordance with an embodiment of the invention is illustrated in FIGS. 11a and 11b. In FIG. 11a, AFM morphologies of unmodified hydrogel after $1^{st}$, $3^{rd}$, and $50^{th}$ repeated icing/deicing tests are shown. In FIG. 11b, AFM morphologies of PDMS-modified PG1-PFO hydrogel after $1^{st}$, $3^{rd}$, and $50^{th}$ repeated icing/deicing tests are shown.

Scanning electron microscopy (SEM) images of PG1-PFO hydrogel surface morphologies after different mechanical abrasion tests in accordance with an embodiment of the invention is illustrated in FIGS. 12a and 12b. In FIG. 12a, fine sand with particle diameter of smaller than about 300 μm is used in the abrasion tests. In FIG. 12b, coarse sand with particle diameter of about 800-300 μm is used in the tests. The morphologies of fine sand (1201) and coarse sand (1204), the morphologies of PG1-PFO hydrogel surface before fine sand abrasion tests (1202) and after fine sand tests (1203), and morphologies of PG1-PFO hydrogel surface before coarse sand abrasion tests (1205) and after coarse sand mechanical abrasion tests (1206) are shown. Some embodiments provide that the PDMS-modified hydrogel of PG1-PFO is soft matter, and the surface scratches can be observed through mechanical abrasion tests. Away from the fall to 0.4 m height, the sand (~10 g) fell on the PG1-PFO hydrogel surface, and the impact velocity is about 2.8 m/s. The PG1-PFO hydrogel samples are held at an angle of 45° to the ground. The initial PG1-PFO hydrogel surface is flat and smooth as shown in 1202 and 1205. The fine sand (particle diameter is smaller than about 300 μm) would not damage the surface, and the morphology of PG1-PFO hydrogel surface is almost the same after mechanical abrasion test (1203). However, the PDMS-modified hydrogel of PG1-PFO is still soft matter, and the surface scratches can still be observed through rigorous mechanical abrasion tests as shown in 1206.

Example 4: Overall Anti-Icing Performance

Many embodiments provide that the PG1-PFO hydrogel have broad applicability of anti-icing, owing to the properties of inhibiting ice formation and reducing ice adhesion. Several embodiments provide PG1-PFO coatings on different substrates for various anti-icing/frosting application. High scalability of the hydrogel fabrication process in accordance with certain embodiments allows PG1-PFO to be coated on a wide range of devices. In several embodiments, substrate surfaces can be vinyl-functionalized before a layer of anti-icing hydrogel thin film can be spin coated. Several embodiments include that vinyl functionalization can be achieved with dopamine methacrylamide (DMA). In a number of embodiments, DMA can be coated onto different inorganic and organic materials including (but not limited to): metals, plastics, oxides, and ceramics.

Figure 13:
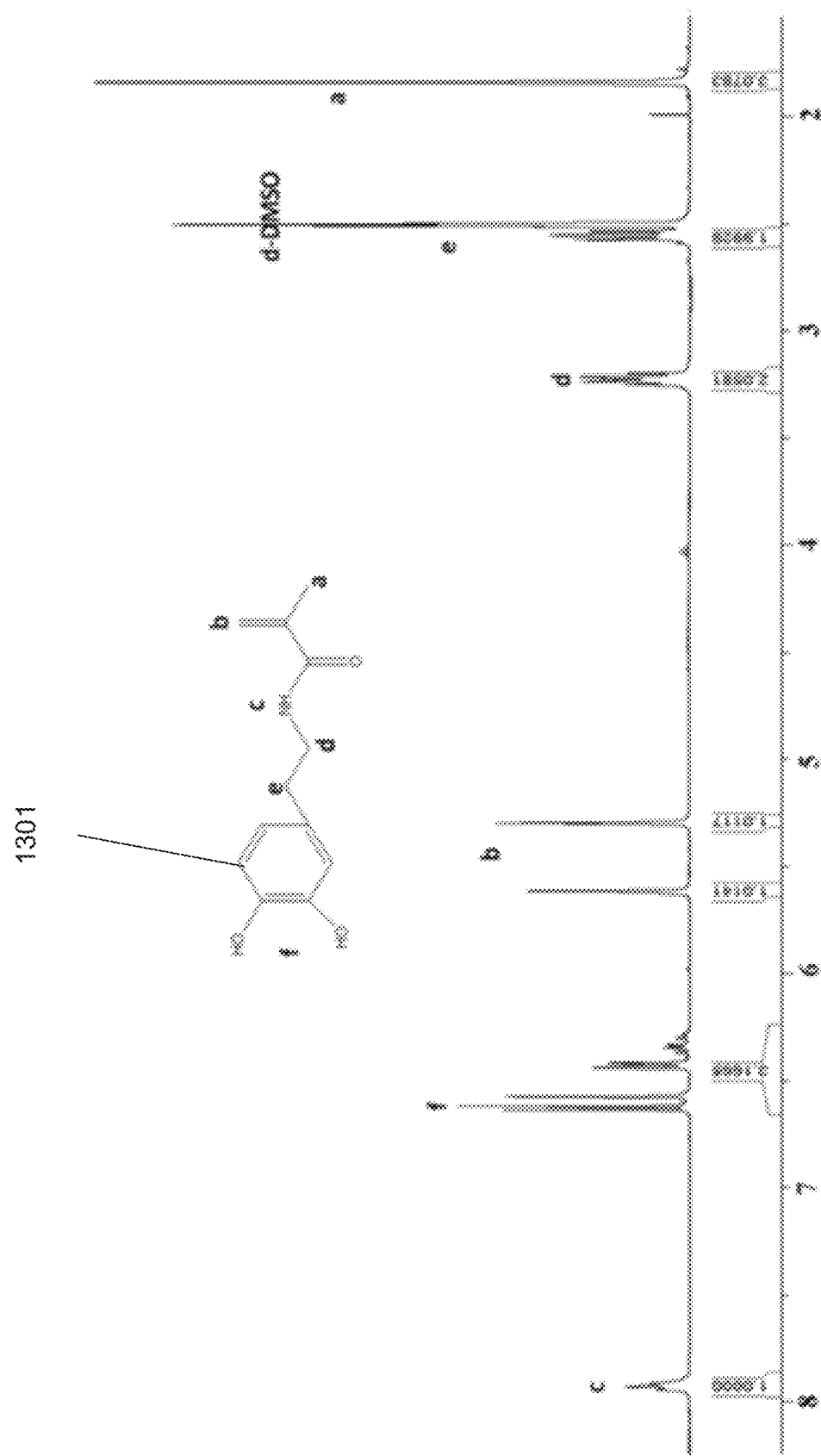
FIG. 13 illustrates $^1$H NMR spectrum of dopamine methacrylamide (DMA) in accordance with an embodiment.
Figure 14:
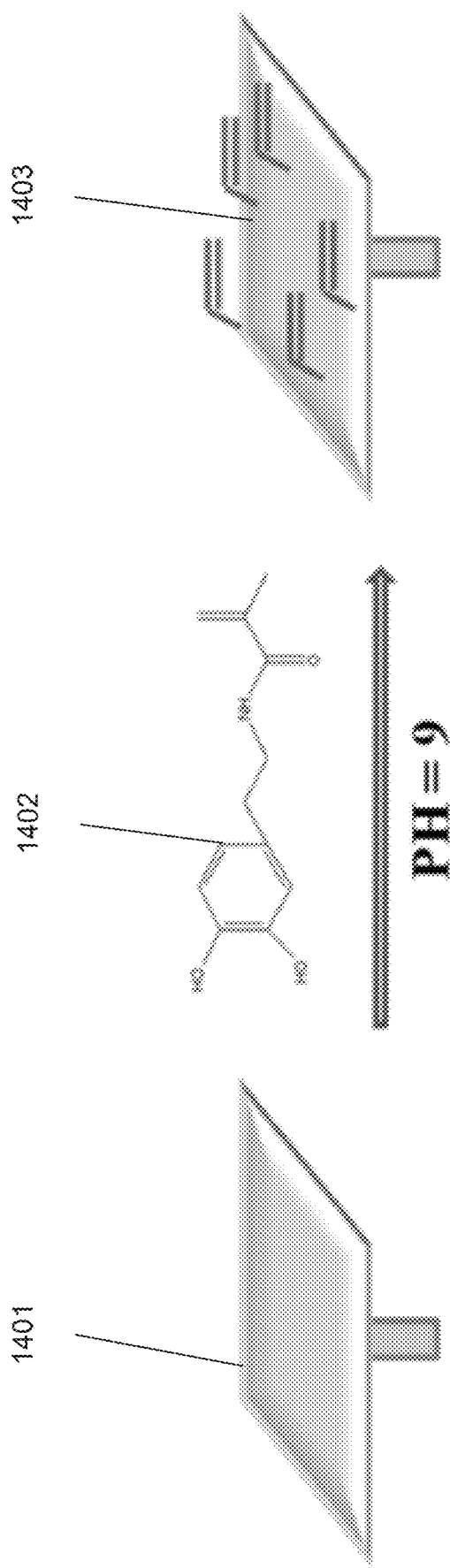
FIG. 14 illustrates dopamine methacrylamide (DMA) can be coated onto different inorganic and organic materials, such as metals, plastics, oxides and ceramics in accordance with an embodiment.

An H NMR spectrum of dopamine methacrylamide in accordance with an embodiment of the invention is illustrated in FIG. 13. DMA chemical structure is shown in 1301. H NMR spectrum exhibits corresponding absorption peaks of functional groups a-f in DMA. A schematic of coating DMA onto various substrates in accordance with an embodiment of the invention is illustrated in FIG. 14. The substrate (1401) can be of various materials, such as metals, plastics, oxides, and ceramics. DMA (1402) with a pH of around 9, can be coated on to the substrate to form a vinyl-functioned surface (1403). The vinyl-functioned surface can be furthered modified with anti-icing hydrogel films.

Figure 15A:
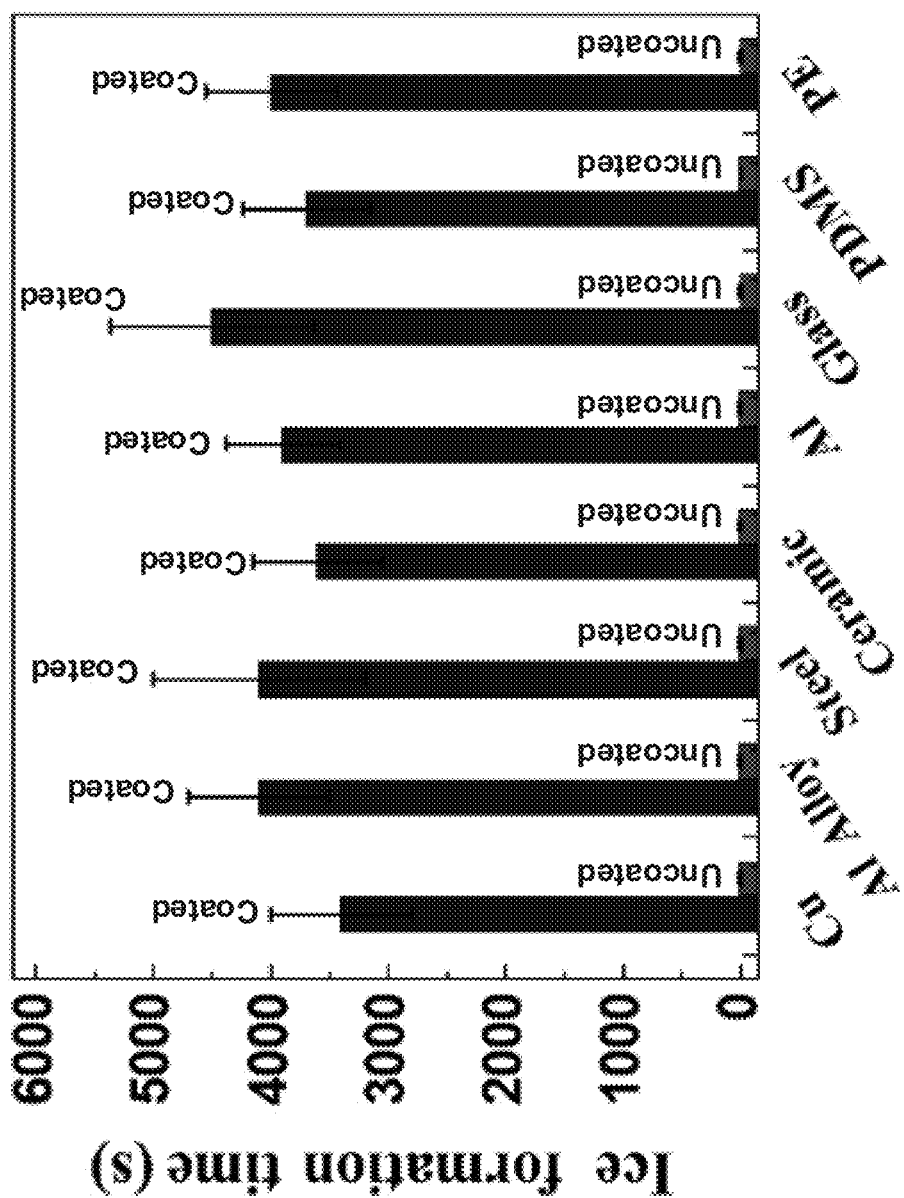
FIGS. 15a to 15d illustrate: a) a data graph of ice formation time on various substrates at −25° C. before and after coated with PG1-PFO hydrogel in accordance with an embodiment, b) a data graph of $\tau_{ice}$ on various substrates before and after coated with PG1-PFO hydrogel in accordance with an embodiment, c) images of ice formation on the PG1-PFO surface for different times at −25° C. when the supersaturation is 106% in accordance with an embodiment, and d) images of ice formed at −25° C. on the PG1-PFO surface is blown off by breeze in accordance with an embodiment.
Figure 16:
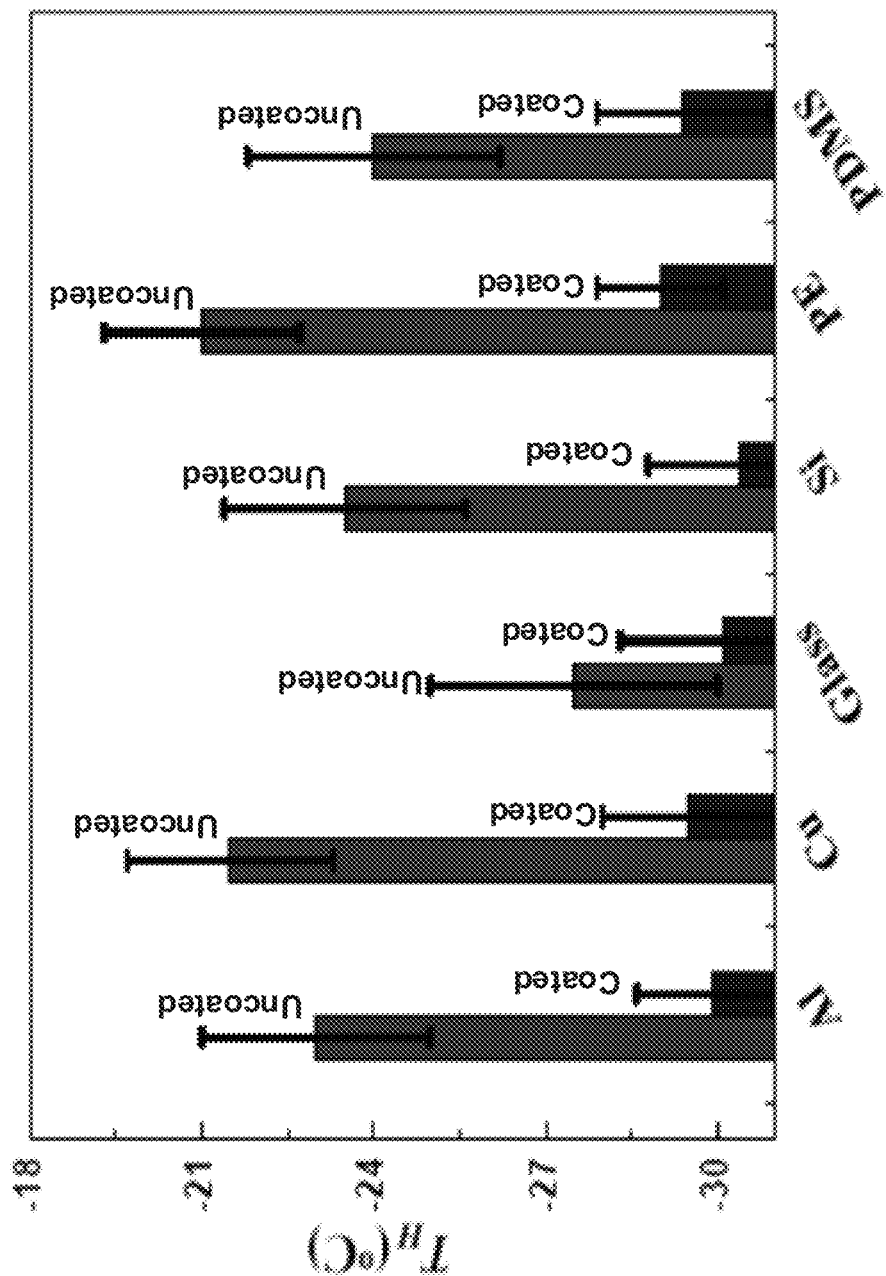
FIG. 16 illustrates a data graph of $T_H$ on various PG1-coated and uncoated substrates in accordance with an embodiment.
Figure 17:
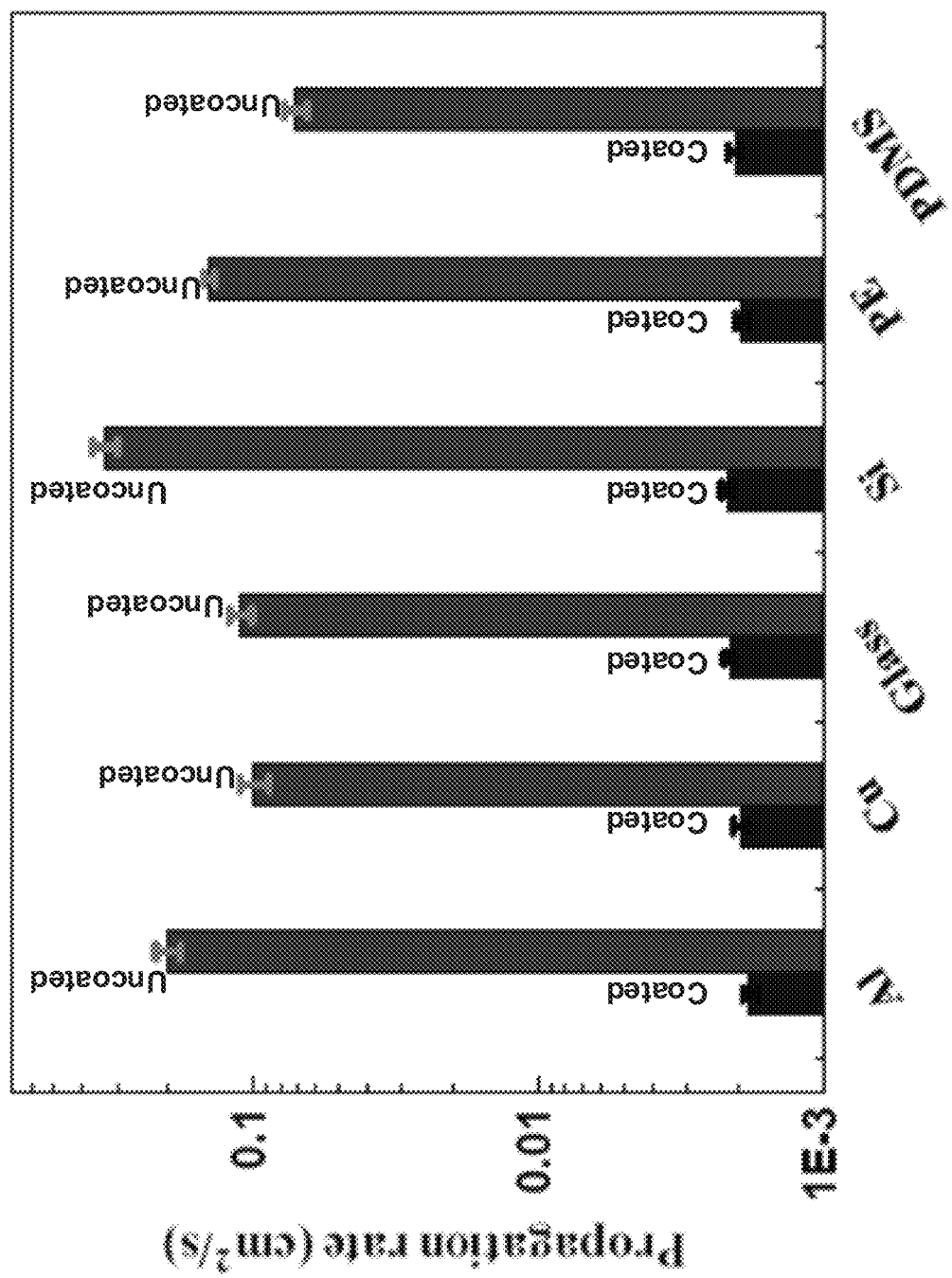
FIG. 17 illustrates a data graph of ice propagation rate on various PG1-PFO coated and uncoated substrates in accordance with an embodiment.

Many embodiments provide the ice formation and ice adhesion behaviors on different substrates to integrate comprehensive icephobic functions into surfaces. A data graph of ice formation time on various substrates at −25° C. before and after coated with PG1-PFO hydrogel in accordance with an embodiment of the invention is illustrated in FIG. 15a. The ice formation times on various coated and uncoated surfaces including metal (Cu, Al alloy, steel, Al), ceramic, glass, and polymer (PDMS, PE) are compared. The coated surfaces show a much longer ice formation time of at least 3000 seconds compared to uncoated surfaces. All the uncoated surfaces form ice immediately at −25° C., while the PG1-PFO coated surfaces remain unfrozen more than 3000 seconds under the same conditions. Various substrates of Cu, Al alloy, steel, ceramic, Al, glass, PDMS, and PE with PG1-PFO hydrogel coating do not exhibit much difference in ice formation time. A data graph of $T_H$ on various PG1-PFO coated and uncoated substrates in accordance with an embodiment of the invention is illustrated in FIG. 16. The $T_H$ on various coated and uncoated surfaces including Al, Cu, glass, Si, PDMS, and PE are compared. The coated surfaces show a much lower $T_H$ of around −30° C. compared to uncoated surfaces. Various substrates of Cu, Al, glass, Si, PDMS, and PE with PG1-PFO hydrogel coating do not exhibit much difference in $T_H$. The Ice propagation rate on various PG1-PFO coated and uncoated substrates in accordance to an embodiment of the invention is illustrated in FIG. 17. The ice propagation rate on various coated and uncoated surfaces including Al, Cu, glass, Si, PDMS, and PE are compared. The coated surfaces show a much lower ice propagation rate of less than 0.002 cm$^2$/s compared to uncoated surfaces. Various substrates of Cu, Al, glass, Si, PDMS, and PE with PG1-PFO hydrogel coating do not exhibit much difference in ice propagation rate.

Figure 15B:
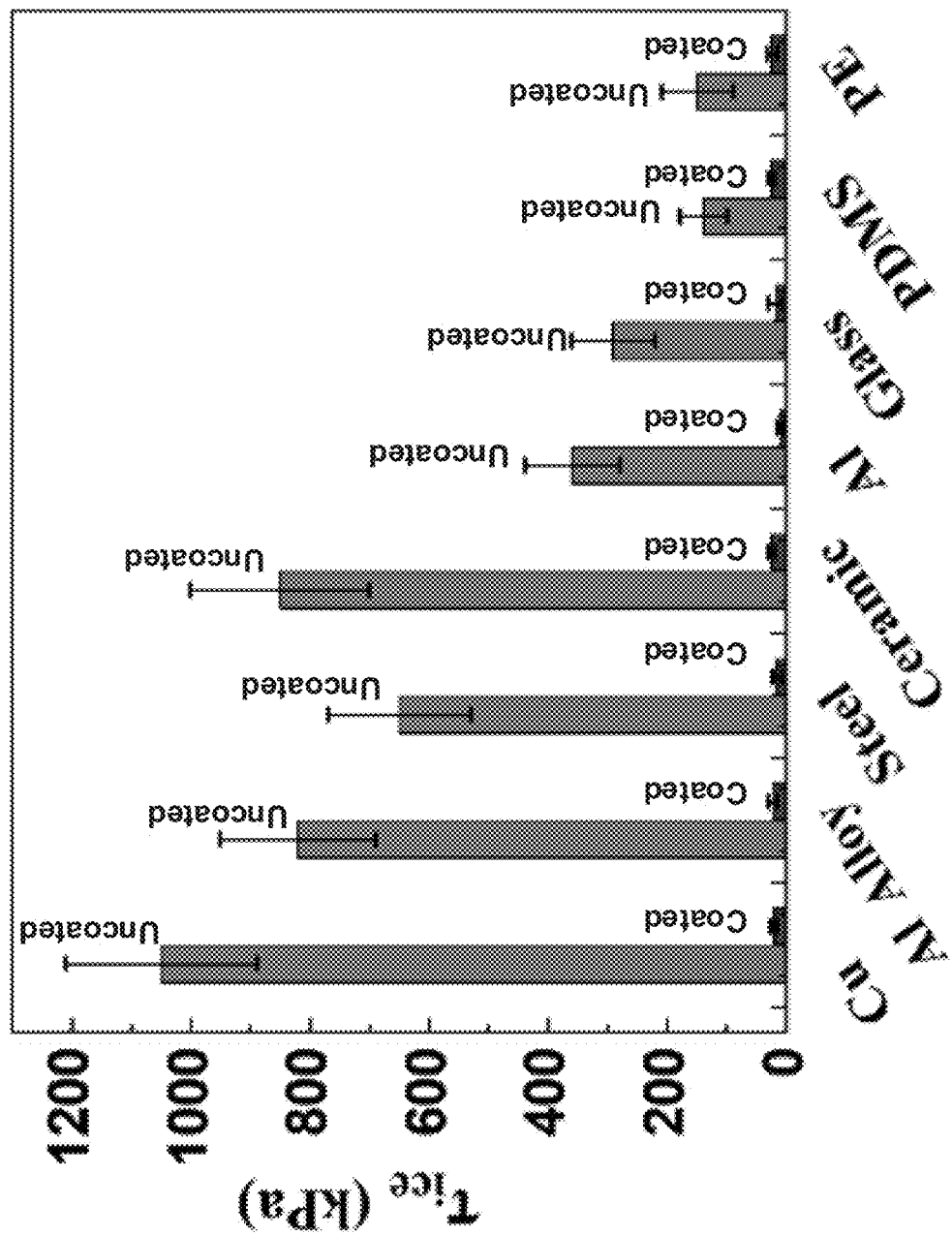

Several embodiments provide that the ice adhesion strength deceases when the substrates are coated with anti-icing hydrogel thin films. Some embodiments show PG1-PFO coating can decrease ice adhesion strength. Ice adhesion strength $\tau_{ice}$ on various substrates before and after coated with PG1-PFO hydrogel in accordance with an embodiment of the invention is illustrated in FIG. 15b. PG1-PFO is coated on various substrates including metals (copper, aluminum, aluminum alloy, steel), ceramics, glass, and polymer (PDMS, PE). The coated surfaces show a much lower $\tau_{ice}$ of less than 20 KPa compared to uncoated surfaces. Various substrates of Cu, Al alloy, Al, steel, ceramics, glass, PDMS, and PE with PG1-PFO hydrogel coating do not exhibit much difference in $\tau_{ice}$.

Figure 15C:
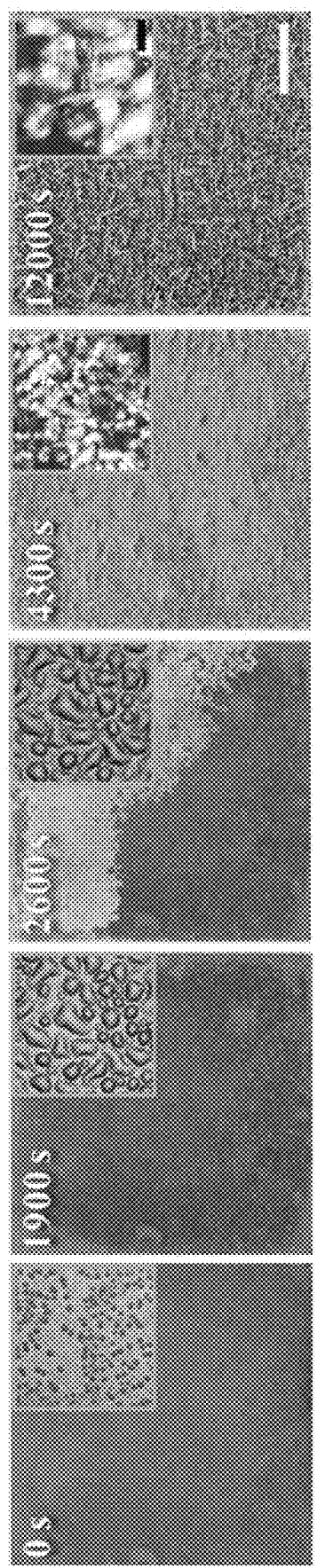
Figure 15D:
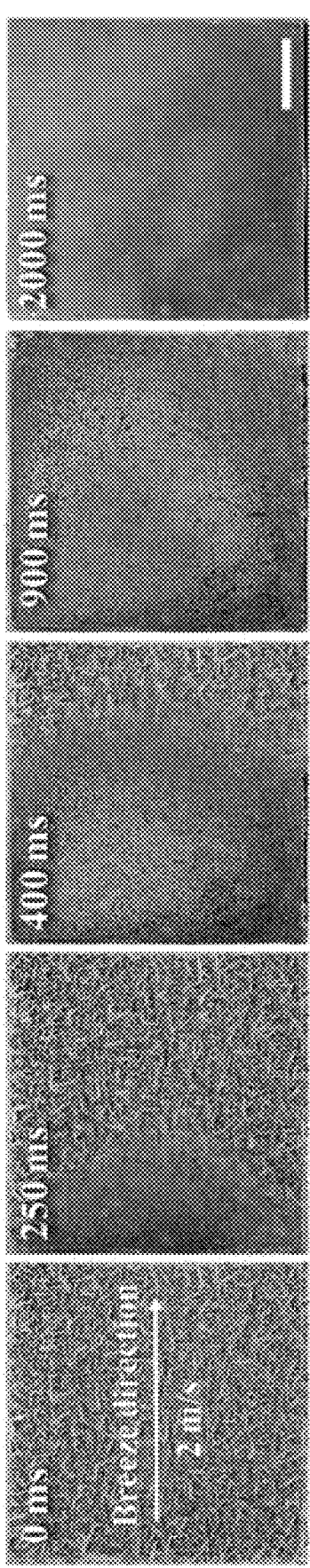

Some embodiments provide the workability of PG1-PFO coating for deicing in real environments at around −25° C. Images of ice formation on the PG1-PFO surface for different times at −25° C. when the supersaturation is 106% in accordance with an embodiment of the invention is illustrated in FIG. 15c. Images of ice formed at −25° C. on the PG1-PFO surface is blown off by breeze in accordance with an embodiment of the invention is illustrated in FIG. 15d. Due to the ice nucleation inhibition on PG1-PFO surface, water condenses and coarsens for more than 1900 seconds. After ice nucleation, the ice propagates slowly via ice bridging. The whole surface is covered with ice in about 4000 seconds, and then the ice layer thickens with time. For most icephobic surface with ultralow ice adhesion strength, airflow can be a feasible measure to remove ice. Owing to the low ice adhesion on PG1-PFO surface, the ice can be blown off easily by breeze with about 2 m/s wind speed within about 2 seconds.

Example 5: Examination of Applications

Many embodiments provide a multifunctional anti-icing platform based on polydimethylsiloxane (PDMS)-grafted polyelectrolyte hydrogel that can simultaneously inhibit ice nucleation, prevent ice growth, and reduce ice adhesion. The properties of interfacial water can be controlled by tuning the synergy of hydrophobicity and ion specificity, in contrast with the conventional wholly hydrophobic bulk systems (e.g., PDMS). Several embodiments provide a method to integrate various icephobic advantages into one material. The controllability of interfacial water enables the polyelectrolyte hydrogel coating high performance in (1) inhibiting ice nucleation (ice nucleation temperature lower than −30° C.); (2) preventing ice propagation (ice propagation rate lower than 0.002 cm$^2$/s); (3) reducing ice adhesion (ice adhesion strength lower than 20 kPa).

Several embodiments provide an all-around anti-icing material with comprehensive performances in aspects including ice nucleation inhibition, ice propagation prevention, and ice adhesion reduction. Hydrogel, which contains different types of interfacial water, provides a platform for tuning interfacial water structure, mobility, and amount, based on chemical modifications in accordance with some embodiments. In certain embodiments, the polymer network of the poly(acrylamide-co-acrylic acid-co-N-allylacrylamide) (poly(AAm-co-AAc-co-AAene)) hydrogels offers a scaffold to carry multiple hydrophobic and charged groups. The copolymerization of cationic [2-(methacryloyloxy)ethyl]trimethylammonium (META) monomer and monomethacrylate-functional PDMS macromonomers of different chain length can be carried out using an in-situ photopolymerization method, forming crosslinks of a series of different graft lengths and compositions. A number of embodiments provide that modular designs of the polyelectrolyte hydrogel film possess several advantages. The embedded counterions in the hydrogel can be easily exchanged in accordance with some embodiments, providing a tunable microenvironment of ion specificity. In several embodiments, the surface hydrophobicity can be readily controlled with the incorporation of various hydrophobic grafted PDMS segments. The PDMS-grafted electrolyte hydrogel is fundamentally different from the conventional design: the PDMS chains in accordance with some embodiments are to balance the hydrophilic matrix and thus regulate the interfacial water and also strengthen the intrinsic mechanically weak hydrogel. The conventional PDMS-based anti-icing materials mainly utilize its highly hydrophobic nature to repel water. The fine balance of ion specificity and hydrophobicity can be implemented to enable regulate the interfacial water to an optimum state and lead to the improved anti-icing performance from the conventional pure bulk PDMS and polyelectrolyte surfaces, in terms of freezing temperature, operation window, and condition in accordance with many embodiments.

In several embodiments, a multifunctional anti-icing platform based on PDMS-grafted polyelectrolyte hydrogel can simultaneously inhibit ice nucleation, prevent ice growth, and reduce ice adhesion, by combining hydrogen-bonding and hydrophobic groups to effectively regulate interfacial water. Embodiments successfully embody multifunctional anti-icing material based on PDMS-grafted polyelectrolyte hydrogel. The simplicity, mechanical durability, and versatility make it promising for broad anti-icing applications.

Some embodiments provide that anti-icing hydrogel coatings can be used in train bogie. When trains are running wintry conditions, disturbances can be due to formation of ice around the bogie, which can pose a risk to the safety of high-speed trains. For instance, the heat released by the train can melt the snow into liquid water which may freeze later, the heavy ice may block the moving parts of brake calipers, putting the operation of high-speed trains at high risk. The snow and ice packing on the elastic suspension can restrain the displacement of springs which can intensify the vibration of the train. Several embodiments provide that the anti-icing hydrogel can inhibit ice nucleation and reduce ice adhesion to avoid ice coverage on the bogie surface.

Several embodiments provide that anti-icing hydrogel coatings can be applied in air conditioner, heat pump, and refrigerator. Coils in air conditioner can freeze while used in below zero temperature, and this may cause a malfunction. Once enough ice builds up, it can stop the evaporation fan and further deteriorate the situation, heavy ice can accumulate onto the surface. If left running in this condition, the ice buildup can cause permanent damage. In many embodiments, the thin-layer anti-icing hydrogel coating with thickness of about 50 nm to about 800 nm can be coated onto the metal substrate in large area without affecting the heat exchange. The coatings can inhibit the ice nucleation and propagation on the surface. With ultra-low ice adhesion, the ice on the surface can be blown away in accordance with embodiments.

Some embodiments provide that anti-icing hydrogel coatings can be used in power lines. Icing phenomenon can occur on power transmission lines. The undesired icing may bring problems like short-circuiting and collapsing of towers because of weight added by the ice. Additionally, the accumulation of snow on insulators can reduce their electrical strength and thus result in icing flashover. The accumulation of snow can reduce the air gap. The appliance of anti-icing hydrogel coatings in accordance with embodiments can effectively inhibit the hazardous ice formations and allow for easy removal of ice with minimum energy input.

In many embodiments, coatings can be applied on various places. The coating layers can be chemically modulated and modified due to its design modularity (electrolyte polymer matrix, ions, and hydrophobic functional groups), fabrication simplicity as a coating layer, and its mechanical robustness compared to microstructure-based anti-icing surfaces.

DOCTRINE OF EQUIVALENTS

As can be inferred from the above discussion, the above-mentioned concepts can be implemented in a variety of arrangements in accordance with embodiments of the invention. Accordingly, although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What is claimed is:

1. An anti-icing material comprising:
   a hydrophilic polyelectrolyte material containing at least one counterion, and
   a hydrophobic polydimethylsiloxane (PDMS);
   wherein the PDMS is cross-linked onto the polyelectrolyte material;
   wherein the anti-icing material inhibits ice nucleation, inhibits ice propagation, and reduces ice adhesion.

2. The anti-icing material of claim 1, wherein the anti-icing material inhibits ice nucleation at a temperature of lower than −30° C.

3. The anti-icing material of claim 1, wherein the anti-icing material inhibits ice propagation at a time of greater than 500 s/cm$^2$.

4. The anti-icing material of claim 1, wherein the anti-icing material reduces ice adhesion strength to less than 20 kPa.

5. The anti-icing material of claim 1, wherein the anti-icing material is a hydrogel.

6. The anti-icing material of claim 1, wherein the hydrophilic polyelectrolyte material is poly(acrylamide-co-acrylic acid-co-N-allylacrylamide).

7. The anti-icing material of claim 6, further comprising [poly[2-(Methacryloyloxy)ethyl]trimethylammonium].

8. The anti-icing material of claim 1, wherein the PDMS has a molecular weight from 0.9 K to 13.2 K.

9. The anti-icing material of claim 1, wherein the at least one counterion is selected from the group of: iodide (I$^-$), acetate (Ac$^-$), chloride (Cl$^-$), hexafluorophosphate (PF$_6^-$), SO$_4^{2-}$, and PFO$^-$.

10. The anti-icing material of claim 1, wherein the material is deposited on a substrate selected from the group of: metal, plastic, glass, silicon, ceramic, and polymer.

11. The anti-icing material of claim 10, wherein the metal is copper, aluminum, aluminum alloy, or steel.

12. The anti-icing material of claim 10, wherein the polymer is PDMS or polyethylene.

13. The anti-icing material of claim 1, wherein the anti-icing material is spin-coated onto a substrate to form a film.

14. The anti-icing material of claim 13, wherein the film has a thickness of 53 nm.

15. A method of fabricating an anti-icing coating, comprising:
   functionalizing a substrate with at least one vinyl group;
   preparing a precursor solution comprising at least one hydrophilic polyelectrolyte material, a hydrophobic polydimethylsiloxane, and an initiator;
   depositing the precursor solution on the substrate; and
   polymerizing the precursor solution on the substrate to form the anti-icing coating.

16. The method of claim 15, wherein the deposition of the precursor solution is by spin coating.

17. The method of claim 15, wherein the polymerization is by UV light.

18. The method of claim 15, wherein the anti-icing coating inhibits ice nucleation at a temperature of lower than −30° C.

19. The method of claim 15, wherein the anti-icing coating inhibits ice propagation at a time of greater than 500 s/cm$^2$.

20. The method of claim 15, wherein the anti-icing coating reduces ice adhesion strength to less than 20 kPa.

21. The method of claim 15, wherein the anti-icing coating is a hydrogel.

22. The method of claim 15, wherein the hydrophilic polyelectrolyte material is poly(acrylamide-co-acrylic acid-co-N-allylacrylamide).

23. The method of claim 22, further comprising [poly[2-(Methacryloyloxy)ethyl]trimethylammonium].

24. The method of claim 15, wherein the PDMS has a molecular weight from 0.9 K to 13.2 K.

25. The method of claim 15, further comprising ion exchanging the polymerized anti-icing coatings with a counterion.

26. The method of claim 25, wherein the counterion is selected from the group of: iodide (I$^-$), acetate (Ac$^-$), chloride (Cl$^-$), hexafluorophosphate (PF$_6^-$), SO$_4^{2-}$, and PFO$^-$.

27. The method of claim 15, wherein the substrate is selected from the group of: metal, plastic, glass, silicon, ceramic, and polymer.

28. The method of claim 27, wherein the metal is copper, aluminum, aluminum alloy, or steel.

29. The method of claim 27, wherein the polymer is PDMS or polyethylene.

* * * * *